US012443945B2

(12) United States Patent
Nichani et al.

(10) Patent No.: US 12,443,945 B2
(45) Date of Patent: Oct. 14, 2025

(54) SYSTEM, METHOD, AND COMPUTER PROGRAM PRODUCT FOR EXCHANGING TRANSACTION DATA

(71) Applicant: Visa International Service Association, San Francisco, CA (US)

(72) Inventors: Roshankumar Vishin Nichani, Winchester (GB); Adam Foster, Thatcham (GB); Anatolie Popusoi, Calcot (GB); Youwan Thapa, Basingstoke (GB)

(73) Assignee: Visa International Service Association, San Francisco, CA (US)

( * ) Notice: Subject to any disclaimer, the term of this patent is extended or adjusted under 35 U.S.C. 154(b) by 225 days.

(21) Appl. No.: 17/941,803

(22) Filed: Sep. 9, 2022

(65) Prior Publication Data

US 2023/0004961 A1  Jan. 5, 2023

Related U.S. Application Data

(63) Continuation of application No. 17/437,451, filed as application No. PCT/US2019/036317 on Jun. 10, 2019, now Pat. No. 11,475,440.

(51) Int. Cl.
*G06Q 20/38* (2012.01)
*G06Q 20/20* (2012.01)
(Continued)

(52) U.S. Cl.
CPC ....... *G06Q 20/3825* (2013.01); *G06Q 20/202* (2013.01); *G06Q 20/204* (2013.01);
(Continued)

(58) Field of Classification Search
CPC ............ G06Q 20/3825; G06Q 20/202; G06Q 20/204; G06Q 20/3226; G06Q 20/3278;
(Continued)

(56) References Cited

U.S. PATENT DOCUMENTS 8,190,885 B2 * 5/2012 Obereiner ............. H04L 9/0844
713/156
9,432,088 B2  8/2016 Shimshoni
(Continued)

FOREIGN PATENT DOCUMENTS

CN  106465112 A  2/2017
CN  107491961 A  12/2017
(Continued)

OTHER PUBLICATIONS

Camenisch et al., "Blind and Anonymous Identity-Based Encryption and Authorised Private Searches on Public Key Encrypted Data", International Workshop on Public Key Cryptography, Mar. 12, 2009, 19 pages. Retrieved from https://link.springer.com/content/pdf.10.1007/978-3-642-00468-1_12.pdf.
(Continued)

*Primary Examiner* — John W Hayes
*Assistant Examiner* — Taylor S Rak
(74) *Attorney, Agent, or Firm* — The Webb Law Firm

(57) ABSTRACT

Disclosed are methods for exchanging transaction data, including transmitting a first public encryption key and transaction data associated with a transaction to a computing device via a near field communication (NFC) connection, receiving a second public encryption key and a transaction message associated with the transaction via the NFC connection, and appending the second public encryption key and the transaction message associated with the transaction to a database stored in a memory in communication with at least one integrated circuit, wherein the at least one integrated circuit is powered by an electromagnetic field generated by the computing device. Systems and computer program products are also provided.

9 Claims, 10 Drawing Sheets

(51) Int. Cl.
*G06Q 20/32* (2012.01)
*H04B 5/00* (2024.01)

(52) U.S. Cl.
CPC ..... *G06Q 20/3226* (2013.01); *G06Q 20/3278* (2013.01); *G06Q 20/38215* (2013.01); *G06Q 20/3829* (2013.01); *G06Q 20/389* (2013.01); *H04B 5/00* (2013.01)

(58) Field of Classification Search
CPC ......... G06Q 20/38215; G06Q 20/3829; G06Q 20/389; H04B 5/00
See application file for complete search history.

(56) References Cited

U.S. PATENT DOCUMENTS

| | | | |
|---|---|---|---|
| 10,846,694 B2 | 11/2020 | Wong et al. | |
| 11,475,440 B2* | 10/2022 | Nichani | G06Q 20/3226 |
| 2011/0147451 A1 | 6/2011 | Bakshi | |
| 2012/0290376 A1 | 11/2012 | Dryer et al. | |
| 2013/0268378 A1 | 10/2013 | Yovin | |
| 2014/0006281 A1 | 1/2014 | Leber | |
| 2014/0074637 A1 | 3/2014 | Hammad | |
| 2014/0220888 A1 | 8/2014 | Shimshoni | |
| 2014/0376721 A1* | 12/2014 | Perez | H04W 12/04 380/270 |
| 2015/0019443 A1 | 1/2015 | Sheets et al. | |
| 2015/0142654 A1 | 5/2015 | Zamer et al. | |
| 2015/0155739 A1 | 6/2015 | Walley et al. | |
| 2016/0055485 A1* | 2/2016 | Benoit | H04W 12/06 705/71 |
| 2016/0210622 A1 | 7/2016 | Yang et al. | |
| 2016/0267458 A1 | 9/2016 | Metral | |
| 2016/0275471 A1 | 9/2016 | Rajamannar | |
| 2018/0232732 A1 | 8/2018 | Rodrigues et al. | |
| 2018/0330354 A1 | 11/2018 | Xiu et al. | |
| 2018/0349901 A1 | 12/2018 | Chen et al. | |
| 2019/0139029 A1 | 5/2019 | Kadiwala et al. | |
| 2019/0156326 A1* | 5/2019 | Todasco | H04W 4/80 |
| 2021/0248590 A1* | 8/2021 | Lu | G06Q 20/3278 |

FOREIGN PATENT DOCUMENTS

| | | |
|---|---|---|
| CN | 109493016 A | 3/2019 |
| WO | 2014123511 A1 | 8/2014 |
| WO | 2015148850 A1 | 10/2015 |
| WO | 2017214288 A1 | 12/2017 |

OTHER PUBLICATIONS

Ye, "Research on Anonymous Mobile Payment Based on NFC Technology", Journal of Taiyuan Normal University (Natural Science Edition), Dec. 2017, pp. 63-68, vol. 16, No. 4. [Relevant for reasons stated in the CN Office Action].

* cited by examiner

SYSTEM, METHOD, AND COMPUTER PROGRAM PRODUCT FOR EXCHANGING TRANSACTION DATA

CROSS-REFERENCE TO RELATED APPLICATIONS

The present application is a continuation application of U.S. patent application Ser. No. 17/437,451, filed Jun. 10, 2019, which is the United States national phase of International Application No. PCT/US2019/036317 filed Jun. 10, 2019, the disclosures of which are hereby incorporated by reference in their entirety.

BACKGROUND

1. Technical Field

This disclosure relates to transaction processing and, in some non-limiting embodiments or aspects, to systems, methods, and apparatus for exchanging transaction data when a connection to a transaction service provider cannot be established.

2. Technical Considerations

Many events, such as auto shows, farmers markets, and the like take place in locations where network connectivity may be limited, unreliable, and/or non-existent. As a result, parties to transactions in these locations may forego the use of electronic payment processing methods and revert to traditional paper-money based transactions. Similarly, local area networks (e.g., via Wi-Fi® networks and/or the like) that enable communication with a payment processing network (e.g., via the Internet) may suffer from interference as the amount of devices connecting to the local area network increases, resulting in slowed or impeded network connectivity. In this situation, parties may forego the use of electronic payment processing methods. Presently, systems and methods do not exist which are able to efficiently and effectively allow parties to engage in the use of electronic payment processing when network connectivity is impaired.

SUMMARY

Accordingly, and generally, provided are improved systems, methods, and apparatus for exchanging transaction data.

According to some non-limiting embodiments or aspects, provided is a computer-implemented method for exchanging transaction data, the computer-implemented method comprising: transmitting, with at least one processor, a first public encryption key via a near field communication (NFC) connection, the first public encryption key of a first computing device; receiving, with at least one processor, transaction data associated with a transaction at the first computing device via the NFC connection, the transaction data associated with the transaction comprising: a second public encryption key of a second computing device; and a transaction identifier of the transaction, generating, with at least one processor, a transaction message associated with the transaction based on the transaction data associated with the transaction and the first public encryption key; encrypting, with at least one processor, at least a portion of the transaction message associated with the transaction with the second public encryption key; determining, with at least one processor, that a network communication connection to a payment processing network different from the NFC connection can be established; and transmitting, with at least one processor, the transaction message via the network communication connection based on determining the network communication connection to the payment processing network can be established.

According to some non-limiting embodiments or aspects, provided is a system for exchanging transaction data, the system comprising: at least one processor programmed or configured to: transmit a first public encryption key via a near field communication (NFC) connection, the first public encryption key of a first computing device; receive transaction data associated with a transaction at the first computing device via the NFC connection, the transaction data associated with the transaction comprising: a second public encryption key of a second computing device; and a transaction identifier of the transaction, generate a transaction message associated with the transaction based on the transaction data associated with the transaction and the first public encryption key; encrypt at least a portion of the transaction message associated with the transaction with the second public encryption key; determine that a network communication connection to a payment processing network different from the NFC connection can be established; and transmit the transaction message via the network communication connection based on determining the network communication connection to the payment processing network can be established.

According to some non-limiting embodiments or aspects, provided is a computer program product for exchanging transaction data, comprising at least one non-transitory computer-readable medium including one or more instructions that, when executed by at least one processor, cause the at least one processor to: transmit a first public encryption key via a near field communication (NFC) connection, the first public encryption key of a first computing device; receive transaction data associated with a transaction at the first computing device via the NFC connection, the transaction data associated with the transaction comprising: a second public encryption key of a second computing device; and a transaction identifier of the transaction, generate a transaction message associated with the transaction based on the transaction data associated with the transaction and the first public encryption key; encrypt at least a portion of the transaction message associated with the transaction with the second public encryption key; determine that a network communication connection to a payment processing network different from the NFC connection can be established; and transmit the transaction message via the network communication connection based on determining the network communication connection to the payment processing network can be established.

According to some non-limiting embodiments or aspects, provided is a computer-implemented method for identifying duplicate secure payment transactions executed when a connection to a payment processing network cannot be established, the computer-implemented method comprising: receiving, with at least one processor, a first transaction message associated with a transaction from a first computing device, the first transaction message comprising: a public encryption key of the first computing device; and transaction data associated with the transaction, the transaction data encrypted with a public encryption key associated with a second computing device; decrypting, with at least one processor, the transaction data of the first transaction message with a private encryption key associated with the second computing device; determining, with at least one processor, the transaction data associated with the transaction corresponding to the first transaction message does not match transaction data corresponding to a message stored in a database; determining, with at least one processor, the transaction data associated with the transaction corresponding to the first transaction message is received before a second transaction message associated with the transaction; and processing, with at least one processor, the transaction data associated with the transaction corresponding to the first transaction message.

According to some non-limiting embodiments or aspects, provided is a system for identifying duplicate secure payment transactions executed when a connection to a payment processing network cannot be established, the system comprising: at least one processor programmed or configured to: receive a first transaction message associated with a transaction from a first computing device, the first transaction message comprising: a public encryption key of first computing device; and transaction data associated with the transaction, the transaction data encrypted with a public encryption key associated with a second computing device; decrypt the transaction data associated with the transaction of the first transaction message with a private encryption key associated with the second computing device; determine that the transaction data associated with the transaction corresponding to the first transaction message does not match transaction data corresponding to a message stored in a database; determine that the transaction data associated with the transaction corresponding to the first transaction message is received before a second transaction message associated with the transaction; and process the transaction data associated with the transaction corresponding to the first transaction message.

According to some non-limiting embodiments or aspects, provided is a computer program product for identifying duplicate secure payment transactions executed when a connection to a payment processing network cannot be established, comprising at least one non-transitory computer-readable medium including instructions that, when executed by at least one processor, cause the at least one processor to: receive a first transaction message associated with a transaction from a first computing device, the first transaction message comprising: a public encryption key of the first computing device; and transaction data associated with the transaction, the transaction data encrypted with a public encryption key associated with a second computing device; decrypt the transaction data associated with the transaction of the first transaction message with a private encryption key associated with the second computing device; determine that the transaction data associated with the transaction corresponding to the first transaction message does not match transaction data corresponding to a message stored in a database; determine that the transaction data associated with the transaction corresponding to the first transaction message is received before a second transaction message associated with the transaction; and process the transaction data associated with the transaction corresponding to the first transaction message.

According to some non-limiting embodiments or aspects, provided is a computer implemented method for identifying duplicate secure payment transactions executed when a connection to a payment processing network cannot be established, the computer implemented method comprising: receiving, with at least one processor, a first transaction message associated with a transaction from a first computing device, the first transaction message comprising: a public encryption key associated with the first computing device; and transaction data associated with a transaction, the transaction data encrypted with a public encryption key of a second computing device; receiving, with at least one processor, a second transaction message associated with the transaction from the second computing device, the second transaction message comprising: the public encryption key associated with the second computing device; and transaction data associated with the transaction, the transaction data encrypted with a public encryption key of the first computing device; decrypting the transaction data corresponding to the first transaction message with a private encryption key of the second computing device; decrypting the transaction data corresponding to the second transaction message with a private encryption key of the first computing device; determining the transaction data corresponding to the first transaction message matches the transaction data corresponding to the second transaction message; and processing the transaction data associated with the transaction message, the transaction data corresponding to the first transaction message, wherein the first transaction message is received before the second transaction message.

According to some non-limiting embodiments or aspects, provided is a system for identifying duplicate secure payment transactions executed when a connection to a payment processing network cannot be established, the system comprising: at least one processor programmed or configured to: receive a first transaction message associated with a transaction from a first computing device, the first transaction message comprising: a public encryption key associated with the first computing device; and transaction data associated with a transaction, the transaction data encrypted with a public encryption key of a second computing device; receive a second transaction message associated with the transaction from the second computing device, the second transaction message comprising: the public encryption key associated with the second computing device; and transaction data associated with the transaction, the transaction data encrypted with a public encryption key of the first computing device; decrypt the transaction data corresponding to the first transaction message with a private encryption key of the second computing device; decrypt the transaction data corresponding to the second transaction message with a private encryption key of the first computing device; determine that the transaction data corresponding to the first transaction message matches the transaction data corresponding to the second transaction message; and process the transaction data associated with the transaction message, the transaction data corresponding to the first transaction message, wherein the first transaction message is received before the second transaction message.

According to some non-limiting embodiments or aspects, provided is a computer program product for identifying duplicate secure payment transactions executed when a connection to a payment processing network cannot be established comprising one or more instructions that, when executed by at least one processor, cause the at least one processor to: receive a first transaction message associated with a transaction from a first computing device, the first transaction message comprising: a public encryption key associated with the first computing device; and transaction data associated with a transaction, the transaction data encrypted with a public encryption key of a second computing device; receive a second transaction message associated with the transaction from the second computing device, the second transaction message comprising: the public encryption key associated with the second computing device; and transaction data associated with the transaction, the transaction data encrypted with a public encryption key of the first computing device; decrypt the transaction data corresponding to the first transaction message with a private encryption key of the second computing device; decrypt the transaction data corresponding to the second transaction message with a private encryption key of the first computing device; determine that the transaction data corresponding to the first transaction message matches the transaction data corresponding to the second transaction message; and process the transaction data associated with the transaction message, the transaction data corresponding to the first transaction message, wherein the first transaction message is received before the second transaction message.

According to some non-limiting embodiments or aspects, provided is a method for receiving secure payment transactions when a connection to a payment processing network cannot be established, comprising: transmitting, with at least one integrated circuit, a first public encryption key and transaction data associated with a transaction to a computing device via an NFC connection; receiving, with at least one integrated circuit, a second public encryption key and a transaction message associated with the transaction via the NFC connection; and appending, with at least one integrated circuit, the second public encryption key and the transaction message associated with the transaction to a database stored in a memory in communication with the at least one integrated circuit, wherein the at least one integrated circuit is powered by an electromagnetic field generated by the computing device.

According to some non-limiting embodiments or aspects, provided is a near-field communication (NFC) transponder device for receiving secure payment transactions when a connection to a payment processing network cannot be established, the NFC transponder device comprising: at least one integrated circuit programmed or configured to: transmit a first public encryption key and transaction data associated with a transaction to a computing device via an NFC connection; receive a second public encryption key and a transaction message associated with the transaction via the NFC connection; and append the second public encryption key and the transaction message associated with the transaction to a database stored in a memory in communication with the at least one integrated circuit, wherein the at least one integrated circuit is powered by an electromagnetic field generated by a computing device.

According to some non-limiting embodiments or aspects, provided is a computer program product for receiving secure payment transactions when a connection to a payment processing network cannot be established, comprising at least one non-transitory computer-readable medium including one or more instructions that, when executed by at least one integrated circuit, cause the at least one integrated circuit to: transmit a first public encryption key and transaction data associated with a transaction to a computing device via an NFC connection; receive a second public encryption key and a transaction message associated with the transaction via the NFC connection; and append the second public encryption key and the transaction message associated with the transaction to a database stored in a memory in communication with the at least one integrated circuit, wherein the at least one integrated circuit is powered by an electromagnetic field generated by computing device.

Further non-limiting embodiments or aspects are set forth in the following numbered clauses:

Clause 1. A computer-implemented method for exchanging transaction data, the computer-implemented method comprising: transmitting, with at least one processor, a first public encryption key via a near field communication (NFC) connection, the first public encryption key of a first computing device; receiving, with at least one processor, transaction data associated with a transaction at the first computing device via the NFC connection, the transaction data associated with the transaction comprising: a second public encryption key of a second computing device; and a transaction identifier of the transaction, generating, with at least one processor, a transaction message associated with the transaction based on the transaction data associated with the transaction and the first public encryption key; encrypting, with at least one processor, at least a portion of the transaction message associated with the transaction with the second public encryption key; determining, with at least one processor, that a network communication connection to a payment processing network different from the NFC connection can be established; and transmitting, with at least one processor, the transaction message via the network communication connection based on determining the network communication connection to the payment processing network can be established.

Clause 2. The computer-implemented method according to clause 1, further comprising: determining the network communication connection to the payment processing network cannot be established.

Clause 3. The computer-implemented method according to clauses 1 or 2, further comprising: signing at least a portion of the transaction message associated with the transaction by encrypting at least a portion of the transaction message with a first private encryption key of the first computing device.

Clause 4. The computer-implemented method according to any of clauses 1-3, further comprising: determining that the network communication connection to the payment processing network cannot be established after generating the transaction message associated with the transaction; and storing the transaction message associated with the transaction and the first public encryption key in a memory of the first computing device based on determining the network communication connection to the payment processing network cannot be established.

Clause 5. The computer-implemented method according to any of clauses 1-4, wherein transaction data associated with a transaction further comprises: the second public encryption key of the second computing device.

Clause 6. The computer-implemented method according to any of clauses 1-5, further comprising: transmitting the transaction message associated with the transaction to the second computing device.

Clause 7. The computer-implemented method according to any of clauses 1-6, further comprising: transmitting a payment token associated with a payment account for a user associated with the first computing device to the second computing device, wherein the first public encryption key and the payment token are stored in a first region of memory of the second computing device.

Clause 8. The computer-implemented method according to any of clauses 1-7, wherein transmitting the first public encryption key from the first computing device comprises: transmitting a payment token associated with a payment account for a user associated with the first computing device.

Clause 9. The computer-implemented method according to any of clauses 1-8, wherein the transaction message associated with the transaction further comprises the second public encryption key.

Clause 10. The computer-implemented method according to any of clauses 1-9, further comprising: encrypting at least a portion of the transaction message using the second public encryption key prior to transmitting the transaction message to the second computing device via the NFC connection.

Clause 11. The computer-implemented method according to any of clauses 1-10, wherein the second computing device is a NFC transponder device, and wherein transmitting the transaction message associated with the transaction via the NFC connection causes an integrated circuit of the second computing device to append the transaction message to a first region in a memory of second computing device.

Clause 12. The computer-implemented method according to any of clauses 1-11, further comprising: generating an electromagnetic field at the first computing device to power the second computing device, wherein receiving the second public encryption key and the transaction data associated with the transaction from the second computing device via the NFC connection comprises: receiving the second public encryption key and the transaction data associated with the transaction from the second computing device based on the second computing device being powered by the first computing device.

Clause 13. A system for exchanging transaction data, the system comprising: at least one processor programmed or configured to: transmit a first public encryption key via a near field communication (NFC) connection, the first public encryption key of a first computing device; receive transaction data associated with a transaction at the first computing device via the NFC connection, the transaction data associated with the transaction comprising: a second public encryption key of a second computing device; and a transaction identifier of the transaction, generate a transaction message associated with the transaction based on the transaction data associated with the transaction and the first public encryption key; encrypt at least a portion of the transaction message associated with the transaction with the second public encryption key; determine that a network communication connection to a payment processing network different from the NFC connection can be established; and transmit the transaction message via the network communication connection based on determining the network communication connection to the payment processing network can be established.

Clause 14. The system according to clause 13, wherein the at least one processor is further programmed or configured to: determine that the network communication connection to the payment processing network cannot be established.

Clause 15. The system according to clauses 13 or 14, wherein the at least one processor is further programmed or configured to: sign at least a portion of the transaction message associated with the transaction by encrypting at least a portion of the transaction message with a first private encryption key of the first computing device.

Clause 16. The system according to any of clauses 13-15, wherein the at least one processor is further programmed or configured to: determine that the network communication connection to the payment processing network cannot be established after generating the transaction message associated with the transaction; and store the transaction message associated with the transaction and the first public encryption key in a memory of the first computing device based on determining the network communication connection to the payment processing network cannot be established.

Clause 17. The system according to any of clauses 13-16, wherein transaction data associated with a transaction further comprises: the second public encryption key of the second computing device.

Clause 18. The system according to any of clauses 13-17, wherein the at least one processor is further programmed or configured to: transmit the transaction message associated with the transaction to the second computing device.

Clause 19. The system according to any of clauses 13-18, wherein the at least one processor is further programmed or configured to: transmit a payment token associated with a payment account for a user associated with the first computing device to the second computing device, wherein the first public encryption key and the payment token are stored in a first region of memory of the second computing device.

Clause 20. The system according to any of clauses 13-19, wherein, when transmitting the first public encryption key from the first computing device, the at least one processor is further programmed or configured to: transmit a payment token associated with a payment account for a user associated with the first computing device.

Clause 21. The system according to any of clauses 13-20, wherein the transaction message associated with the transaction further comprises the second public encryption key.

Clause 22. The system according to any of clauses 13-21, wherein the at least one processor is further programmed or configured to: encrypt at least a portion of the transaction message using the second public encryption key prior to transmitting the transaction message to the second computing device via the NFC connection.

Clause 23. The system according to any of clauses 13-22, wherein the second computing device is a NFC transponder device, and wherein, when transmitting the transaction message associated with the transaction via the NFC connection, the at least one processor is further programmed or configured to cause an integrated circuit of the second computing device to append the transaction message to a first region in a memory of second computing device.

Clause 24. The system according to any of clauses 13-23, wherein the at least one processor is further programmed or configured to: generate an electromagnetic field at the first computing device to power the second computing device, and wherein, when receiving the second public encryption key and the transaction data associated with the transaction from the second computing device via the NFC connection, the at least one processor is further programmed or configured to: receive the second public encryption key and the transaction data associated with the transaction from the second computing device based on the second computing device being powered by the first computing device.

Clause 25. A computer program product for exchanging transaction data, comprising at least one non-transitory computer-readable medium including one or more instructions that, when executed by at least one processor, cause the at least one processor to: transmit a first public encryption key via a near field communication (NFC) connection, the first public encryption key of a first computing device; receive transaction data associated with a transaction at the first computing device via the NFC connection, the transaction data associated with the transaction comprising: a second public encryption key of a second computing device; and a transaction identifier of the transaction, generate a transaction message associated with the transaction based on the transaction data associated with the transaction and the first public encryption key; encrypt at least a portion of the transaction message associated with the transaction with the second public encryption key; determine that a network communication connection to a payment processing network different from the NFC connection can be established; and transmit the transaction message via the network communication connection based on determining the network communication connection to the payment processing network can be established.

Clause 26. The computer program product according to clause 25, wherein the one or more instructions further cause the at least one processor to: determine that the network communication connection to the payment processing network cannot be established.

Clause 27. The computer program product according to clauses 25 or 26, wherein the one or more instructions further cause the at least one processor to: sign at least a portion of the transaction message associated with the transaction by encrypting at least a portion of the transaction message with a first private encryption key of the first computing device.

Clause 28. The computer program product according to any of clauses 25-27, wherein the one or more instructions further cause the at least one processor to: determine that the network communication connection to the payment processing network cannot be established after generating the transaction message associated with the transaction; and store the transaction message associated with the transaction and the first public encryption key in a memory of the first computing device based on determining the network communication connection to the payment processing network cannot be established.

Clause 29. The computer program product according to any of clauses 25-28, wherein the one or more instructions further cause the at least one processor to: the second public encryption key of the second computing device.

Clause 30. The computer program product according to any of clauses 25-29, wherein the one or more instructions further cause the at least one processor to: transmit the transaction message associated with the transaction to the second computing device.

Clause 31. The computer program product according to any of clauses 25-30, wherein the one or more instructions further cause the at least one processor to: transmit a payment token associated with a payment account for a user associated with the first computing device to the second computing device, wherein the first public encryption key and the payment token are stored in a first region of memory of the second computing device.

Clause 32. The computer program product according to any of clauses 25-31, wherein, the one or more instructions that cause the at least one processor to transmit the first public encryption key from the first computing device, further cause the at least one processor to: transmit a payment token associated with a payment account for a user associated with the first computing device.

Clause 33. The computer program product according to any of clauses 25-32, wherein the transaction message associated with the transaction further comprises the second public encryption key.

Clause 34. The computer program product according to any of clauses 25-33, wherein the one or more instructions further cause the at least one processor to: encrypt at least a portion of the transaction message using the second public encryption key prior to transmitting the transaction message to the second computing device via the NFC connection.

Clause 35. The computer program product according to any of clauses 25-34, wherein the one or more instructions that cause the at least one processor to transmit the transaction message associated with the transaction via the NFC connection, further cause the at least one processor to: cause an integrated circuit of the second computing device to append the transaction message to a first region in a memory of second computing device.

Clause 36. The computer program product according to any of clauses 25-35, wherein the one or more instructions further cause the at least one processor to: generate an electromagnetic field at the first computing device to power the second computing device, and wherein, when receiving the second public encryption key and the transaction data associated with the transaction from the second computing device via the NFC connection, the at least one processor is further programmed or configured to: receive the second public encryption key and the transaction data associated with the transaction from the second computing device based on the second computing device being powered by the first computing device.

Clause 37. A computer-implemented method for identifying duplicate secure payment transactions executed when a connection to a payment processing network cannot be established, the computer-implemented method comprising: receiving, with at least one processor, a first transaction message associated with a transaction from a first computing device, the first transaction message comprising: a public encryption key of the first computing device; and transaction data associated with the transaction, the transaction data encrypted with a public encryption key associated with a second computing device; decrypting, with at least one processor, the transaction data of the first transaction message with a private encryption key associated with the second computing device; determining, with at least one processor, the transaction data associated with the transaction corresponding to the first transaction message does not match transaction data corresponding to a message stored in a database; determining, with at least one processor, the transaction data associated with the transaction corresponding to the first transaction message is received before a second transaction message associated with the transaction; and processing, with at least one processor, the transaction data associated with the transaction corresponding to the first transaction message.

Clause 38. A system for identifying duplicate secure payment transactions executed when a connection to a payment processing network cannot be established, the system comprising: at least one processor programmed or configured to: receive a first transaction message associated with a transaction from a first computing device, the first transaction message comprising: a public encryption key of first computing device; and transaction data associated with the transaction, the transaction data encrypted with a public encryption key associated with a second computing device; decrypt the transaction data associated with the transaction of the first transaction message with a private encryption key associated with the second computing device; determine that the transaction data associated with the transaction corresponding to the first transaction message does not match transaction data corresponding to a message stored in a database; determine that the transaction data associated with the transaction corresponding to the first transaction message is received before a second transaction message associated with the transaction; and process the transaction data associated with the transaction corresponding to the first transaction message.

Clause 39. A computer program product for identifying duplicate secure payment transactions executed when a connection to a payment processing network cannot be established, comprising at least one non-transitory computer-readable medium including instructions that, when executed by at least one processor, cause the at least one processor to: receive a first transaction message associated with a transaction from a first computing device, the first transaction message comprising: a public encryption key of the first computing device; and transaction data associated with the transaction, the transaction data encrypted with a public encryption key associated with a second computing device; decrypt the transaction data associated with the transaction of the first transaction message with a private encryption key associated with the second computing device; determine that the transaction data associated with the transaction corresponding to the first transaction message does not match transaction data corresponding to a message stored in a database; determine that the transaction data associated with the transaction corresponding to the first transaction message is received before a second transaction message associated with the transaction; and process the transaction data associated with the transaction corresponding to the first transaction message.

Clause 40. A computer implemented method for identifying duplicate secure payment transactions executed when a connection to a payment processing network cannot be established, the computer implemented method comprising: receiving, with at least one processor, a first transaction message associated with a transaction from a first computing device, the first transaction message comprising: a public encryption key associated with the first computing device; and transaction data associated with a transaction, the transaction data encrypted with a public encryption key of a second computing device; receiving, with at least one processor, a second transaction message associated with the transaction from the second computing device, the second transaction message comprising: the public encryption key associated with the second computing device; and transaction data associated with the transaction, the transaction data encrypted with a public encryption key of the first computing device; decrypting the transaction data corresponding to the first transaction message with a private encryption key of the second computing device; decrypting the transaction data corresponding to the second transaction message with a private encryption key of the first computing device; determining the transaction data corresponding to the first transaction message matches the transaction data corresponding to the second transaction message; and processing the transaction data associated with the transaction message, the transaction data corresponding to the first transaction message, wherein the first transaction message is received before the second transaction message.

Clause 41. A system for identifying duplicate secure payment transactions executed when a connection to a payment processing network cannot be established, the system comprising: at least one processor programmed or configured to: receive a first transaction message associated with a transaction from a first computing device, the first transaction message comprising: a public encryption key associated with the first computing device; and transaction data associated with a transaction, the transaction data encrypted with a public encryption key of a second computing device; receive a second transaction message associated with the transaction from the second computing device, the second transaction message comprising: the public encryption key associated with the second computing device; and transaction data associated with the transaction, the transaction data encrypted with a public encryption key of the first computing device; decrypt the transaction data corresponding to the first transaction message with a private encryption key of the second computing device; decrypt the transaction data corresponding to the second transaction message with a private encryption key of the first computing device; determine that the transaction data corresponding to the first transaction message matches the transaction data corresponding to the second transaction message; and process the transaction data associated with the transaction message, the transaction data corresponding to the first transaction message, wherein the first transaction message is received before the second transaction message.

Clause 42. A computer program product for identifying duplicate secure payment transactions executed when a connection to a payment processing network cannot be established comprising one or more instructions that, when executed by at least one processor, cause the at least one processor to: receive a first transaction message associated with a transaction from a first computing device, the first transaction message comprising: a public encryption key associated with the first computing device; and transaction data associated with a transaction, the transaction data encrypted with a public encryption key of a second computing device; receive a second transaction message associated with the transaction from the second computing device, the second transaction message comprising: the public encryption key associated with the second computing device; and transaction data associated with the transaction, the transaction data encrypted with a public encryption key of the first computing device; decrypt the transaction data corresponding to the first transaction message with a private encryption key of the second computing device; decrypt the transaction data corresponding to the second transaction message with a private encryption key of the first computing device; determine that the transaction data corresponding to the first transaction message matches the transaction data corresponding to the second transaction message; and process the transaction data associated with the transaction message, the transaction data corresponding to the first transaction message, wherein the first transaction message is received before the second transaction message.

Clause 43. A method for receiving secure payment transactions while a connection to a payment processing network cannot be established, comprising: transmitting, with at least one integrated circuit, a first public encryption key and transaction data associated with a transaction to a computing device via an NFC connection; receiving, with at least one integrated circuit, a second public encryption key and a transaction message associated with the transaction via the NFC connection; and appending, with at least one integrated circuit, the second public encryption key and the transaction message associated with the transaction to a database stored in a memory in communication with the at least one integrated circuit, wherein the at least one integrated circuit is powered by an electromagnetic field generated by the computing device.

Clause 44. The method according to clause 43, wherein the memory in communication with the at least one integrated circuit has defined therein a first predefined region and a second predefined region.

Clause 45. The method according to clauses 43 or 44, wherein the at least one integrated circuit is configured to limit communication of data to the first predefined region of the memory to computing devices associated with a merchant.

Clause 46. The method according to any of clauses 43-45, wherein the at least one integrated circuit is configured to limit communication of data to the second predefined region of the memory to computing devices associated with users.

Clause 47. The method according to any of clauses 43-46, wherein the at least one integrated circuit is configured to limit communication of data from the second predefined region of the memory to computing devices associated with a merchant.

Clause 48. A near-field communication (NFC) transponder device for receiving secure payment transactions while a connection to a payment processing network cannot be established, the NFC transponder device comprising: at least one integrated circuit programmed or configured to: transmit a first public encryption key and transaction data associated with a transaction to a computing device via an NFC connection; receive a second public encryption key and a transaction message associated with the transaction via the NFC connection; and append the second public encryption key and the transaction message associated with the transaction to a database stored in a memory in communication with the at least one integrated circuit, wherein the at least one integrated circuit is powered by an electromagnetic field generated by a computing device.

Clause 49. The NFC transponder device according to clause 48, wherein the memory in communication with the at least one integrated circuit has defined therein a first predefined region and a second predefined region.

Clause 50. The NFC transponder device according to clauses 48 or 49, wherein the at least one integrated circuit is further programmed or configured to: limit communication of data to the first predefined region of the memory to computing devices associated with a merchant.

Clause 51. The NFC transponder device according to any of clauses 48-50, wherein the at least one integrated circuit is further programmed or configured to: limit communication of data to the second predefined region of the memory to computing devices associated with users.

Clause 52. The NFC transponder device according to any of clauses 48-51, wherein the at least one integrated circuit is further programmed or configured to: limit communication of data from the second predefined region of the memory to computing devices associated with a merchant.

Clause 53. A computer program product for receiving secure payment transactions while a connection to a payment processing network cannot be established, comprising at least one non-transitory computer-readable medium including one or more instructions that, when executed by at least one integrated circuit, cause the at least one integrated circuit to: transmit a first public encryption key and transaction data associated with a transaction to a computing device via an NFC connection; receive a second public encryption key and a transaction message associated with the transaction via the NFC connection; and append the second public encryption key and the transaction message associated with the transaction to a database stored in a memory in communication with the at least one integrated circuit, wherein the at least one integrated circuit is powered by an electromagnetic field generated by computing device.

Clause 54. The computer program product according to clause 53, wherein the one or more instructions further cause the at least one integrated circuit to subdivide the memory in communication with the at least one integrated circuit into a first predefined region and a second predefined region.

Clause 55. The computer program product according to clauses 53 or 54, wherein the one or more instructions further cause the at least one integrated circuit to: limit communication of data to the first predefined region of the memory to computing devices associated with a merchant.

Clause 56. The computer program product according to any of clauses 53-55, wherein the one or more instructions further cause the at least one integrated circuit to: limit communication of data to the second predefined region of the memory to computing devices associated with users.

Clause 57. The computer program product according to any of clauses 53-56, wherein the one or more instructions further cause the at least one integrated circuit to: limit communication of data from the second predefined region of the memory to computing devices associated with a merchant.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details are explained in greater detail below with reference to the exemplary aspects and embodiments that are illustrated in the accompanying schematic figures, in which.

DETAILED DESCRIPTION

Figure 1:
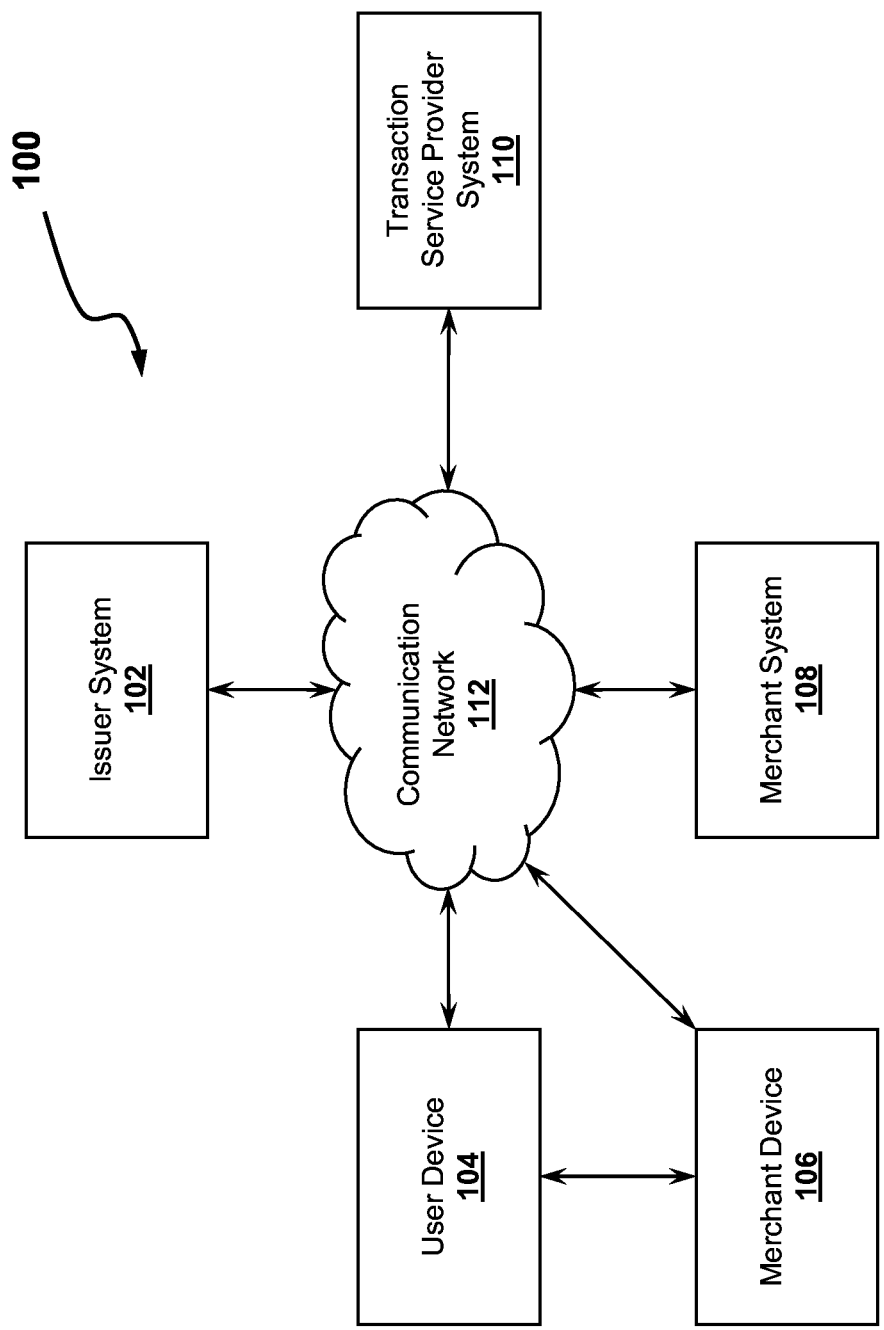
FIG. 1 is a schematic diagram of some non-limiting embodiments or aspects of a system for exchanging transaction data.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. In addition, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some non-limiting embodiments or aspects, a message may refer to a network packet (e.g., a data packet and/or the like) that includes data.

As used herein, the terms "issuer," "issuer institution," "issuer bank," or "payment device issuer," may refer to one or more entities that provide accounts to individuals (e.g., users, customers, and/or the like) for conducting payment transactions, such as credit payment transactions and/or debit payment transactions. For example, an issuer institution may provide an account identifier, such as a primary account number (PAN), to a customer that uniquely identifies one or more accounts associated with that customer. In some non-limiting embodiments or aspects, an issuer may be associated with a bank identification number (BIN) that uniquely identifies the issuer institution. As used herein "issuer system" may refer to one or more computer systems operated by or on behalf of an issuer, such as a server executing one or more software applications. For example, an issuer system may include one or more authorization servers for authorizing a transaction.

As used herein, the term "account identifier" may refer to one or more types of identifiers associated with an account (e.g., a PAN associated with an account, a card number associated with an account, a payment card number associated with an account, a token associated with an account, and/or the like). In some non-limiting embodiments or aspects, an issuer may provide an account identifier (e.g., a PAN, a token, and/or the like) to a user (e.g., an accountholder) that uniquely identifies one or more accounts associated with that user. The account identifier may be embodied on a payment device (e.g., a physical instrument used for conducting payment transactions, such as a payment card, a credit card, a debit card, a gift card, and/or the like) and/or may be electronic information communicated to the user that the user may use for electronic payment transactions. In some non-limiting embodiments or aspects, the account identifier may be an original account identifier, where the original account identifier was provided to a user at the creation of the account associated with the account identifier. In some non-limiting embodiments or aspects, the account identifier may be a supplemental account identifier, which may include an account identifier that is provided to a user after the original account identifier was provided to the user. For example, if the original account identifier is forgotten, stolen, and/or the like, a supplemental account identifier may be provided to the user. In some non-limiting embodiments or aspects, an account identifier may be directly or indirectly associated with an issuer institution such that an account identifier may be a token that maps to a PAN or other type of account identifier. Account identifiers may be alphanumeric, any combination of characters and/or symbols, and/or the like.

As used herein, the term "token" may refer to an account identifier that is used as a substitute or replacement for another account identifier, such as a PAN. Tokens may be associated with a PAN or other original account identifier in one or more data structures (e.g., one or more databases and/or the like) such that they may be used to conduct a payment transaction without directly using the original account identifier. In some non-limiting embodiments or aspects, an original account identifier, such as a PAN, may be associated with a plurality of tokens for different individuals or purposes. In some non-limiting embodiments or aspects, tokens may be associated with a PAN or other account identifiers in one or more data structures such that they can be used to conduct a transaction without directly using the PAN or the other account identifiers. In some examples, an account identifier, such as a PAN, may be associated with a plurality of tokens for different uses or different purposes.

As used herein, the term "merchant" may refer to one or more entities (e.g., operators of retail businesses) that provide goods and/or services, and/or access to goods and/or services, to a user (e.g., a customer, a consumer, and/or the like) based on a transaction, such as a payment transaction. As used herein "merchant system" may refer to one or more computer systems operated by or on behalf of a merchant, such as a server executing one or more software applications. As used herein, the term "product" may refer to one or more goods and/or services offered for sale by a merchant.

As used herein, a "point-of-sale (POS) device" may refer to one or more devices, which may be used by a merchant to conduct a transaction (e.g., a payment transaction) and/or process a transaction. For example, a POS device may include one or more client devices. Additionally or alternatively, a POS device may include peripheral devices, card readers, scanning devices (e.g., code scanners), Bluetooth® communication receivers, near-field communication (NFC) receivers, radio frequency identification (RFID) receivers, and/or other contactless transceivers or receivers, contact-based receivers, payment terminals, and/or the like.

As used herein, a "POS system" may refer to one or more client devices and/or peripheral devices used by a merchant to conduct a transaction. For example, a POS system may include one or more POS devices and/or other like devices that may be used to conduct a payment transaction. In some non-limiting embodiments or aspects, a POS system (e.g., a merchant POS system) may include one or more server computers programmed or configured to process online payment transactions through webpages, mobile applications, and/or the like.

As used herein, the term "transaction service provider" may refer to an entity that receives transaction authorization request messages from merchants or other entities and provides guarantees of payment, in some cases through an agreement between the transaction service provider and an issuer institution. For example, a transaction service provider may include a payment network such as Visa®, MasterCard®, American Express®, or any other entity that processes transactions. As used herein "transaction service provider system" may refer to one or more computer systems operated by or on behalf of a transaction service provider, such as a transaction service provider system executing one or more software applications. A transaction service provider system may include one or more processors and, in some non-limiting embodiments or aspects, may be operated by or on behalf of a transaction service provider.

As used herein, the term "acquirer" may refer to an entity licensed by the transaction service provider and approved by the transaction service provider to originate transactions (e.g., payment transactions) involving a payment device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments or aspects, the acquirer may be authorized by the transaction service provider to assign merchant or service providers to originate transactions involving a payment device associated with the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by the acquirer's payment facilitators, and/or the like. In some non-limiting embodiments or aspects, an acquirer may be a financial institution, such as a bank.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

As used herein, the terms "electronic wallet," "electronic wallet mobile application," and "digital wallet" may refer to one or more electronic devices including one or more software applications configured to facilitate and/or conduct transactions (e.g., payment transactions, electronic payment transactions, and/or the like). For example, an electronic wallet may include a user device (e.g., a mobile device) executing an application program, server-side software, and/or databases for maintaining and providing data to be used during a payment transaction to the user device. As used herein, the term "electronic wallet provider" may include an entity that provides and/or maintains an electronic wallet and/or an electronic wallet mobile application for a user (e.g., a consumer). Examples of an electronic wallet provider include, but are not limited to, Google Wallet™, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "payment device" may refer to an electronic payment device, a portable financial device, a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, and/or the like. The payment device may include a volatile or a non-volatile memory to store information (e.g., an account identifier, a name of the account holder, and/or the like).

As used herein, the term "computing device" may refer to one or more electronic devices that are configured to communicate (e.g., directly or indirectly) with or over one or more networks. A computing device may be a mobile or portable computing device, a desktop computer, a server, and/or the like. Furthermore, the term "computer" may refer to any computing device that includes the necessary components to receive, process, and output data, and normally includes a display, a processor, a memory, an input device, and a network interface. A "computing system" may include one or more computing devices or computers. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, touchscreen, and/or the like). Further, multiple computers, e.g., servers, or other computerized devices, such as an autonomous vehicle including a vehicle computing system, communicating in the network environment may constitute a "system" or a "computing system."

As used herein, the terms "client" and "client device" may refer to one or more computing devices, such as processors, storage devices, and/or similar computer components, that access a service made available by a server. In some non-limiting embodiments or aspects, a "client device" may refer to one or more devices that facilitate payment transactions, such as POS devices and/or POS systems used by a merchant. In some non-limiting embodiments or aspects, a client device may include an electronic device capable of communicating with one or more networks and/or facilitate payment transactions such as, but not limited to, one or more desktop computers, one or more portable computers (e.g., tablet computers), one or more mobile devices (e.g., cellular phones, smartphones, PDAs, wearable devices, such as watches, glasses, lenses, and/or clothing, and/or the like), and/or other like devices. Moreover, a "client" may also refer to an entity, such as a merchant, that owns, utilizes, and/or operates a client device for facilitating payment transactions with a transaction service provider.

As used herein, the term "server" may refer to one or more computing devices, such as processors, storage devices, and/or similar computer components that are capable of communicating with client devices and/or other computing devices over a network, such as the Internet or private networks and, in some examples facilitate communication among other servers and/or client devices.

As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

In some non-limiting embodiments or aspects, the present disclosure is directed to systems, methods, and computer program products for exchanging transaction data. For example, users (e.g., customers) operating user devices to communicate with merchant devices operated by merchants (e.g., NFC transponder devices (e.g., smartphones, mobile point-of-sale (POS) devices, and/or the like) and/or passive NFC transponder devices (e.g., NFC transponder tags)) may cause a user device to initiate or otherwise engage in electronic transactions to complete a purchase. In some non-limiting embodiments or aspects, user devices and/or merchant devices operated during a transaction may determine that a connection to a transaction service provider system cannot be established (e.g., a connection to a transaction service provider system is unavailable). For example, where a network communication connection cannot be established between devices (e.g., a connection to a communication network is unavailable), and a transaction service provider system to communicate data, the devices may communicate data via a short range wireless communication connection. Once a network communication connection is established between the devices and a transaction service provider system, data (e.g., transaction data associated with a transaction, a message associated with a transaction, and/or the like) may be transmitted to a transaction service provider system. Additionally, or alternatively, in some non-limiting embodiments or aspects, devices transmitting data to a transaction service provider system may encrypt some or all of the data prior to transmission. For example, a user device and/or a merchant device may encrypt some or all of the transaction data associated with a transaction and/or a transaction message associated with the transaction prior to or after transmitting the transaction data with the other of the user device or the merchant device. In some non-limiting embodiments or aspects, a user device and/or a merchant device may store transaction data associated with a transaction in memory (fully, partially, or not encrypted). For example, a user device and/or a merchant device may store transaction data associated with a transaction in secured memory (e.g., a region of memory of the user device and/or the merchant device that is access-controlled) until network communication connectivity with a transaction service provider system is established. In this way, transaction processing is improved in that customers and merchants may engage in secured transactions electronically where a network communication connection to a transaction service provider system cannot be established. Moreover, the security of these transactions may be maintained by encrypting some or all of the transaction data associated with the transaction until a device attempting to communicate with a transaction service provider system is able to upload the transaction data.

Referring now to FIG. 1, illustrated is a system 100 for exchanging transaction data when connections to a transaction service provider cannot be established. As illustrated in FIG. 1, the system 100 includes issuer system 102, user device 104, merchant device 106, merchant system 108, and/or transaction service provider system 110. Issuer system 102, user device 104, merchant device 106, merchant system 108, and/or transaction service provider system 110 may communicate via wired connections, wireless connections, or a combination of wired and wireless connections.

Issuer system 102 may include one or more devices capable of being in communication with user device 104, merchant device 106, merchant system 108, and/or transaction service provider system 110 via the communication network 112. For example, issuer system 102 may include one or more computing devices, such as a server, a group of servers, and/or the like. In some non-limiting embodiments or aspects, issuer system 102 may be associated with an issuer institution.

User device 104 may include one or more devices capable of being in communication with issuer system 102, merchant device 106, merchant system 108, and/or transaction service provider system 110 via the communication network 112. For example, user device 104 may include one or more computing devices, portable computers, tablet computers, cellular phones, smartphones, wearable devices (e.g., watches, glasses, lenses, clothing and/or the like), PDAs, and/or the like. In some non-limiting embodiments or aspects, user device 104 may communicate with merchant device 106. In some non-limiting embodiments or aspects, user device 104 may be capable of being in communication with merchant device 106 via a short range wireless communication connection (e.g., a NFC connection, a radio frequency identification (RFID) communication connection, a Bluetooth® communication connection, and/or the like).

Merchant device 106 may include one or more devices capable of being in communication with issuer system 102, user device 104, merchant system 108, and/or transaction service provider system 110 via the communication network 112. For example, merchant device 106 may include one or more computing devices, portable computers, tablet computers, cellular phones, smartphones, wearable devices (e.g., watches, glasses, lenses, clothing and/or the like), PDAs, and/or the like. In another example, merchant device 106 may include a transponder device (e.g., a transponder, an NFC transponder device (FIG. 3), an NFC tag including an antenna, a memory, and an integrated circuit (IC) coupled to the antenna and the memory, and/or the like). In some non-limiting embodiments or aspects, merchant device 106 may include an antenna configured to receive and/or transmit data via an NFC connection, a memory, and an IC in communication with the antenna and the IC. In some non-limiting embodiments the memory associated with the IC and the antenna may be associated with a portion of memory in communication with a processor of user device 104 (e.g., a smartphone), or may be partially or completely segregated from the memory and/or the processor of such devices. In some non-limiting embodiments or aspects, merchant device 106 may communicate with user device 104 via wired connections, wireless connections, or a combination of wired and wireless connections. In some non-limiting embodiments or aspects, merchant device 106 may be capable of being communication with user device 104 via a short range wireless communication connection. In some non-limiting embodiments or aspects, merchant device 106 may be associated with a merchant as described herein.

Merchant system 108 may include one or more devices capable of capable of being in communication with issuer system 102, user device 104, merchant device 106, and/or transaction service provider system 110 via the communication network 112. For example, merchant system 108 may include a computing device, such as a server, a group of servers, a client device, a group of client devices, and/or other like devices. In some non-limiting embodiments or aspects, merchant system 108 may be associated with a merchant as described herein.

Transaction service provider system 110 may include one or more devices capable of being in communication with issuer system 102, user device 104, merchant device 106, and/or merchant system 108 via the communication network 112. For example, transaction service provider system 110 may include one or more computing devices, such as a server, a group of servers, and/or other like devices. In some non-limiting embodiments or aspects, transaction service provider system 110 may be associated with a transaction service provider as described herein.

The communication network 112 may include one or more wired and/or wireless networks. For example, the communication network 112 may include a cellular network (e.g., a long-term evolution (LTE) network, a third generation (3G) network, a fourth generation (4G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of systems, devices, and networks illustrated by FIG. 1 are provided as an example. There may be additional devices, systems, and/or networks, fewer devices, systems, and/or networks, different devices, systems, and/or networks, or differently arranged devices, systems, and/or networks than those shown in FIG. 1. Furthermore, two or more devices or systems shown in FIG. 1 may be implemented within a single device or system, or a single device or system shown in FIG. 1 may be implemented as multiple, distributed devices or systems. Additionally, or alternatively, a set of devices or systems (e.g., one or more devices or systems) of the system 100 may perform one or more functions described as being performed by another set of devices or systems of the system 100.

Figure 2:
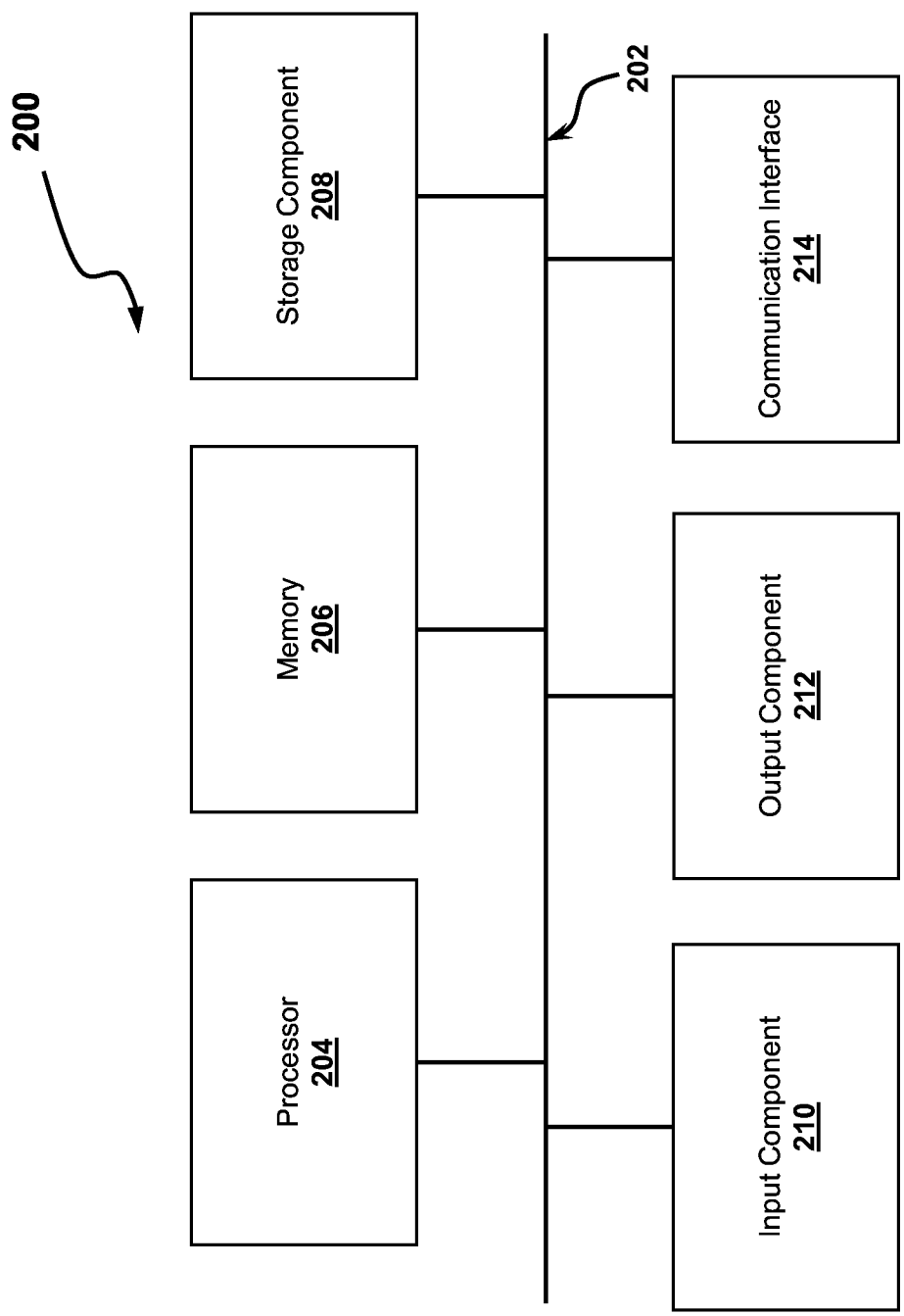
FIG. 2 is a diagram of some non-limiting embodiments or aspects of components of one or more devices of FIG. 1.

Referring now to FIG. 2, illustrated is a diagram of example components of a computing device 200. The components described with regard to computing device 200 may correspond, all or in part, to components of one or more devices associated with issuer system 102, user device 104, merchant device 106, merchant system 108, and/or transaction service provider system 110. In some non-limiting embodiments or aspects, issuer system 102, user device 104, merchant device 106, merchant system 108, and/or transaction service provider system 110 may include at least one computing device 200 and/or one or more components of the computing device 200. As illustrated by FIG. 2, the computing device 200 may include a bus 202, a processor 204, memory 206, a storage component 208, an input component 210, an output component 212, and a communication interface 214.

The bus 202 may include a component that permits communication between the components of the computing device 200. In some non-limiting embodiments or aspects, the processor 204 may be implemented in hardware, firmware, or a combination of hardware and software. For example, the processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA) and/or an application-specific integrated circuit (ASIC), and/or the like) that can be programmed to perform one or more functions. The memory 206 may include random access memory (RAM), read-only memory (ROM), and/or another type of dynamic or static storage device (e.g., flash memory, magnetic memory, optical memory, and/or the like) that stores information and/or instructions for use and/or execution on the processor 204.

The storage component 208 may store information and/or software (e.g., executable instructions) related to the operation and use of the computing device 200. For example, the storage component 208 may include a hard disk (e.g., a magnetic disk, an optical disk, a magneto-optic disk, a solid state disk, and/or the like), a compact disk (CD), a digital versatile disc (DVD), a floppy disk, a cartridge, a magnetic tape, and/or another type of computer-readable medium, along with a corresponding drive.

The input component 210 may include a component that permits the computing device 200 to receive information, such as via user input (e.g., a touch screen display, a keyboard, a keypad, a mouse, a button, a switch, a microphone, and/or the like). Additionally, or alternatively, the input component 210 may include a sensor for sensing information (e.g., a global positioning system (GPS) component, an accelerometer, a gyroscope, an actuator, and/or the like). The output component 212 may include a speaker, one or more light-emitting diodes (LEDs), and/or the like The communication interface 214 may include a transceiver-like component (e.g., a transceiver, a separate receiver and transmitter, and/or the like) that enables the computing device 200 to communicate with other devices, such as via wired connections, wireless connections, or a combination of wired and wireless connections. The communication interface 214 may enable the computing device 200 to receive information from another device and/or provide information to another device. For example, the communication interface 214 may include an Ethernet interface, an optical interface, a coaxial interface, an infrared interface, a radio frequency (RF) interface, a universal serial bus (USB) interface, a Wi-Fi® interface, an NFC interface, a cellular network interface, and/or the like.

The computing device 200 may perform one or more processes described herein. For example, the computing device 200 may perform processes by executing software instructions on the processor 204. The software instructions may be stored in a computer-readable medium, such as memory 206 and/or the storage component 208. A computer-readable medium (e.g., a non-transitory computer-readable medium) is defined herein as a non-transitory memory device. A memory device includes memory space located inside of a single physical storage device or memory space spread across multiple physical storage devices.

The software instructions may be read into memory 206 and/or the storage component 208 from another computer-readable medium from another device via the communication interface 214. When executed, the software instructions stored in the memory 206 and/or the storage component 208 may cause the processor 204 to perform one or more processes described herein. Additionally, or alternatively, hardwired circuitry may be used in place of, or in combination with, software instructions to perform one or more of the processes described herein. Thus, embodiments described herein are not limited to any specific combination of hardware circuitry and/or software.

The number and arrangement of components shown in FIG. 2 are provided as an example. In some non-limiting embodiments or aspects, the computing device 200 may include additional components, fewer components, different components, or differently arranged components than those shown in FIG. 2. Additionally, or alternatively, a set of components (e.g., one or more components) of the computing device 200 may perform one or more functions described as being performed by another set of components of the computing device 200.

Figure 3:
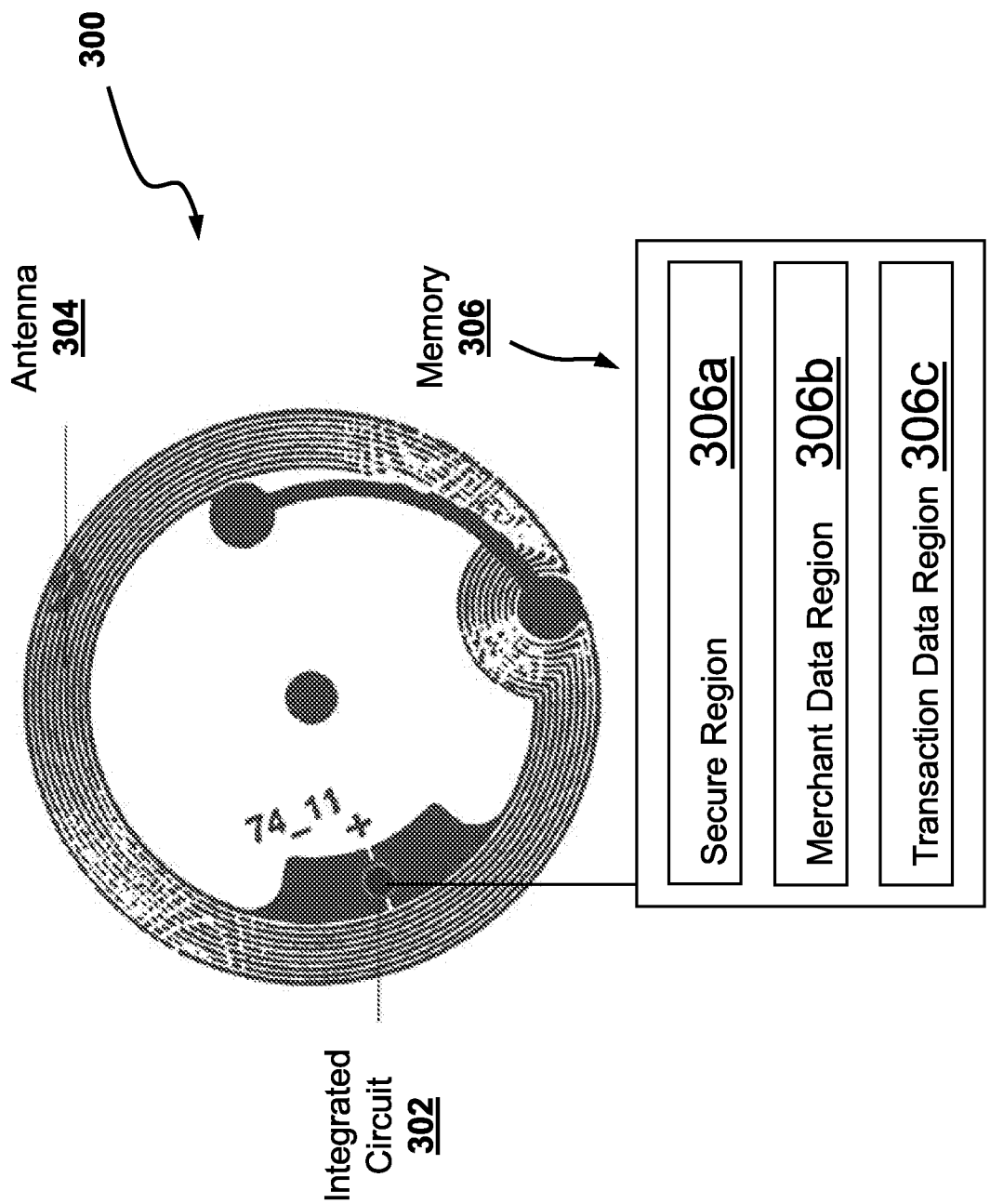
FIG. 3 is a diagram of some non-limiting embodiments or aspects of components of one or more devices of FIG. 1.

Referring now to FIG. 3, illustrated is NFC transponder device 300 according to some non-limiting embodiments or aspects of the present disclosure. NFC transponder device 300 may include an integrated circuit 302, an antenna 304, and a memory 306. In some non-limiting embodiments or aspects, the integrated circuit 302 may have memory included therein, or located external thereto, with the integrated circuit 302 able to read and/or write to the memory (e.g., memory 306). In some non-limiting embodiments or aspects, the integrated circuit 302 may be powered in response to being positioned in proximity to electromagnetic waves (e.g., electromagnetic waves generated via electromagnetic induction). In some non-limiting embodiments or aspects, the integrated circuit 302 may communicate data to and/or from another device (e.g., one or more of the devices of FIG. 1) via the antenna 304. For example, the integrated circuit 302 may cause the antenna 304 to transmit and/or receive data via a short-range wireless communication connection.

In some non-limiting embodiments or aspects, some or all of the components of NFC transponder device 300 may be integrated with (e.g., included in or connected to) one or more devices and/or systems (e.g., one or more of the systems illustrated in FIG. 1). In some non-limiting embodiments or aspects, the antenna 304 may be in communication with a processor (e.g., processor 204) of any of the systems and/or devices of system 100, which, in turn enables operable communication between the antenna 304 and memory (e.g., memory 206) of the device. In some non-limiting embodiments or aspects, the integrated circuit 302 may be in communication with a processor (e.g., processor 204) of any of the systems and/or devices of system 100.

In some non-limiting embodiments or aspects, memory may be partitioned into distinct regions. For example, the memory 306 of NFC transponder device 300 may be partitioned into distinct regions such as, for example, a secure region 306a, a merchant data region 306b, and/or a transaction data region 306c. In some non-limiting embodiments or aspects, the integrated circuit 302 may read from, write to, and/or delete data from the secure region 306a, the merchant data region 306b, and/or the transaction data region 306c based on receiving data via a short range wireless communication connection from another device (e.g., user device 104 and/or the like). In some non-limiting embodiments or aspects, the integrated circuit 302 may read from, write to, and/or delete data from the secure region 306a of the memory 306 in response to receiving data via a short range wireless communication connection from a device associated with a merchant (e.g., merchant device 106 and/or merchant system 108). For example, the integrated circuit 302 may read and/or write device data associated with NFC transponder device 300 (e.g., data including as a unique device identification number (or unique device identifier), a public encryption key of NFC transponder device 300, a private encryption key of NFC transponder device 300, and/or the like). For example, merchant device 106 may transmit device data associated with NFC transponder device 300 to NFC transponder device 300 based on generation and/or assignment of the device data associated with NFC transponder device 300 by merchant device 106 and/or transaction service provider system 110.

In some non-limiting embodiments or aspects, the integrated circuit 302 may not permit communication of data to and/or from the secure region 306a of the memory 306. For example, the integrated circuit 302 may not permit communication of data to and/or from the secure region 306a of the memory based on communicating with a device not associated with a merchant (e.g., when communicating via a short range wireless communication connection with user device 104). In some non-limiting embodiments or aspects, the integrated circuit 302 and/or merchant device 106 may encrypt portions or all of the device data associated with NFC transponder device 300. For example, NFC transponder device 300 may encrypt a portion or all of the device data associated with NFC transponder device 300 (e.g., data associated with a unique device identifier of NFC transponder device 300, data associated with a public encryption key, and/or data associated with a private encryption key). By virtue of the operation of an integrated circuit 302 to selectively encrypt and/or control read and/or write access to a secure region 306a of memory 306, the possibility of inadvertent transmission of sensitive data (e.g., a private encryption key) may be reduced or eliminated.

In some non-limiting embodiments or aspects, the integrated circuit 302 of NFC transponder device 300 may read from, write to, and/or delete data from the merchant data region 306b of the memory 306. For example, the integrated circuit 302 may read and/or write merchant data associated with products available for purchase (e.g., data associated with an identifier of the products, data associated with a cost of the products, data associated with a public encryption key assigned to NFC transponder device 300, and/or the like) to the merchant data region 306b of the memory 306 based on data received from another device (e.g., user device 104). In some non-limiting embodiments or aspects, the integrated circuit 302 may permit communication of data from (e.g., a read), but not to (e.g., a write), the merchant data region 306b of the memory 306. For example, the integrated circuit 302 may permit transmission of merchant data from the merchant data region 306b to user device 104 (e.g., may permit user device 104 to read data from the merchant data region 306b), but may not permit transmission of merchant data to the merchant data region 306b (e.g., may not permit user device 104 to write data to the merchant data region 306b) of the memory 306. By virtue of the operation of an integrated circuit 302 to selectively control read and/or write access to the merchant data region 306b, the possibility of inadvertent alterations to the merchant data associated with the products for purchase that is stored in NFC transponder device 300 may be reduced.

In some non-limiting embodiments or aspects, the integrated circuit 302 of NFC transponder device 300 may read and/or delete data from the transaction data region 306c of the memory 306. For example, the integrated circuit 302 of NFC transponder device 300 may read and/or delete transaction data associated with one or more transactions from the transaction data region 306c of the memory 306 based on communicating via a short range wireless communication connection with a device (e.g., merchant device 106) associated with a merchant. In some non-limiting embodiments or aspects, transaction data associated with one or more transactions stored in the transaction data region 306c may include information such as goods and/or services purchased during the one or more transactions, the cost of such goods and/or services, a public encryption key of user device 104 for the one or more transactions, a device identifier of user device 104 for the one or more transactions, and/or other the like. In some non-limiting embodiments or aspects, the integrated circuit 302 of NFC transponder device 300 may not permit a device to transmit data to (e.g., write data to) the transaction data region 306c of the memory 306. For example, the integrated circuit 302 may not permit merchant device 106 to transmit data to (e.g., write data to) the transaction data region 306c.

In some non-limiting embodiments or aspects, the integrated circuit 302 of NFC transponder device 300 may read, write, and/or delete data from the transaction data region 306c of the memory 306. For example, the integrated circuit 302 of NFC transponder device 300 may read, write, and/or delete transaction data associated with one or more transactions based on communication with user device 104 via a short range wireless communication connection. When making a purchase, the integrated circuit 302 may write transaction data associated with a transaction to the transaction data region 306c of the memory 306 of NFC transponder device 300 based on communication with user device 104 via a communication connection. The integrated circuit 302 may read transaction data associated with a particular transaction from the transaction data region 306c of the memory 306 of NFC transponder device 300 based on communicating via a short range wireless communication connection with user device 104. For example, NFC transponder device 300 may read transaction data associated with a particular transaction from the transaction data region 306c of the memory 306 of NFC transponder device 300 based on receiving a read request from user device 104. Based on receiving a read request from user device 104, the integrated circuit 302 may transmit transaction data associated with a particular transaction to user device 104, user device 104 being the device that transmitted the particular transaction data. The integrated circuit 302 may delete data from the transaction data region 306c of the memory 306 based on communicating via a short range wireless communication connection with user device 104. For example, NFC transponder device 300 may delete transaction data associated with a transaction from the transaction data region 306c of the memory 306 based on receiving a delete request from user device 104. In some non-limiting embodiments or aspects, NFC transponder device 300 may not permit read, write, and/or delete access to transaction data associated with a transaction where the device requesting read, write, and/or delete access is not the device that transmitted the transaction data associated with the transaction. This selective read, write, and/or delete permission may be beneficial, for example, in cases where a user may want to cancel, void, and/or modify a transaction.

Figure 4:
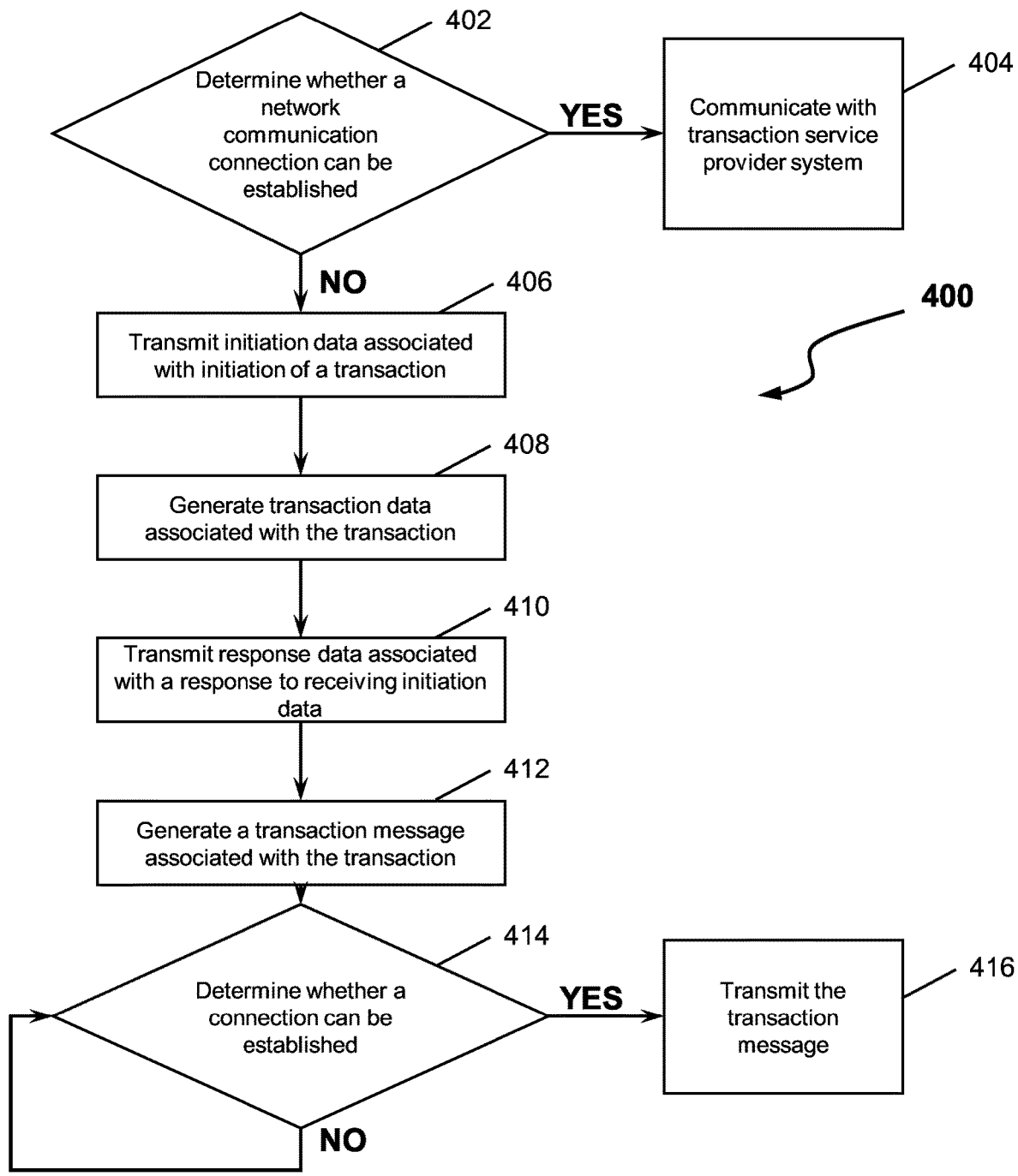
FIG. 4 is a flow diagram of a process for exchanging transaction data according to some non-limiting embodiments or aspects.

Referring now to FIG. 4, illustrated is a flow diagram of some non-limiting embodiments or aspects of a process 400 for exchanging transaction data associated with a payment transaction when a network communication connection (e.g., a connection between two devices across a network such as, without limitation, the Internet, an intranet, and/or the like) to transaction service provider system 110 cannot be established and the payment transaction cannot be processed via a payment processing network associated with the transaction service provider. As described herein, a payment processing network may refer to one or more computing devices that establish one or more network communication connections therebetween to communicate data (e.g., transaction data associated with one or more transactions) when processing transactions. As described herein, network communication connections may refer to the establishment of communications between computing devices via a network (e.g., an intranet, the Internet, and/or the like).

With continued reference to FIG. 4, at step 402, process 400 may include determining whether a connection with a transaction service provider system can be established. For example, user device 104 and/or merchant device 106 may determine whether a network communication connection can be established with transaction service provider system 110. In some non-limiting embodiments or aspects, user device 104 and/or merchant device 106 may determine that a network communication connection cannot be established with transaction service provider system 110 (e.g., "NO" at step 402). In some non-limiting embodiments or aspects, user device 104 and/or merchant device 106 may determine that a network communication connection with transaction service provider system 110 cannot be established based on determining (either at user device 104 and/or merchant device 106) that a network communication connection with transaction service provider system 110 between user device 104 and/or merchant device 106 is unreliable (e.g., that a weak signal (e.g., wireless signal) is detected, that communication of data with transaction service provider system 110 via a network communication connection is occurring at a rate slower than a predetermined timeout threshold, that a network communication connection with transaction service provider system 110 is impeded (e.g., packets are dropping at a rate greater than a predetermined rate), and/or the like.

In some non-limiting embodiments or aspects, user device 104 and/or merchant device 106 may determine that a network communication connection with transaction service provider system 110 can be established (e.g., "YES" at step 402). For example, user device 104 and/or merchant device 106 may determine that a network communication connection with transaction service provider system 110 can be established and/or is reliable based on determining connection is unimpeded (e.g., that a strong signal (e.g., wireless signal) is detected, that data communication with transaction service provider system 110 is occurring at a rate greater than or equal to a predetermined timeout threshold, that communication with transaction service provider system 110 is not impeded (e.g., that packets are not being dropped and/or are being dropped at a rate less than a predetermined rate), and/or the like. In some non-limiting embodiments or aspects, process 400 may continue when user device 104 and/or merchant device 106 determines that a network communication connection can be established between user device 104 or merchant device 106 (but not both) and transaction service provider system 110.

With continued reference to FIG. 4, at step 404, process 400 may include communicating via a network communication connection with transaction service provider system 110 during a transaction (e.g., when user device 104 and/or merchant device 106 are communicating via a short range wireless communication connection during a transaction). In some non-limiting embodiments or aspects, when user device 104 and/or merchant device 106 determines that a network communication connection with transaction service provider system 110 can be established, user device 104 and/or merchant device 106 may communicate via the network communication connection with transaction service provider system 110 during the transaction. For example, user device 104 and/or merchant device 106 may communicate directly with transaction service provider system 110 after exchanging initiation data associated with initiation of a transaction (e.g., a unique device identifier for each device (e.g., a public encryption key of each device), a time, a date, and/or the like) via a short range wireless communication connection.

With continued reference to FIG. 4, at step 406, process 400 may include transmitting initiation data associated with initiation of a transaction. For example, merchant device 106 may transmit initiation data associated with initiation of a transaction. In some non-limiting embodiments or aspects, merchant device 106 may transmit initiation data associated with initiation of a transaction to user device 104. In some non-limiting embodiments or aspects, initiation data associated with initiation of a transaction may include a public encryption key of user device 104, and/or device data associated with the device initiating the transaction (e.g., a unique device identifier assigned to user device 104, a media access control (MAC) address of user device 104, and/or the like). In some non-limiting embodiments or aspects, initiation data associated with initiation of a transaction may include product data associated with one or more goods and/or services for sale. In some non-limiting embodiments or aspects, upon receipt of initiation data associated with initiation of a transaction, user device 104 may store the initiation data associated with initiation of the transaction in memory.

With continued reference to FIG. 4, at step 408, process 400 may include generating transaction data associated with a transaction. For example, user device 104 and/or merchant device 106 may generate transaction data associated with a transaction. In some non-limiting embodiments or aspects, user device 104 may generate transaction data associated with a transaction based on data received by user device 104. For example, user device 104 may generate transaction data associated with a transaction based on data received from merchant device 106 during the transaction (e.g., based on initiation data associated with initiation of a transaction and/or response data associated with a response to receiving initiation data). In some non-limiting embodiments or aspects, user device 104 may generate transaction data associated with a transaction based on input received by user device 104 (e.g., input on a touchscreen of user device 104, input from a user associated with a selection of one or more products, and/or the like).

In some non-limiting embodiments or aspects, merchant device 106 may generate transaction data associated with a transaction based on data received by merchant device 106. For example, merchant device 106 may generate transaction data associated with a transaction based on data received from user device 104 during the transaction (e.g., based on initiation data associated with initiation of a transaction and/or response data associated with a response to receiving initiation data). In some non-limiting embodiments or aspects, merchant device 106 may generate transaction data associated with a transaction based on input received by merchant device 106 (e.g., input on a touchscreen of merchant device 106, input associated with a selection of one or more products, and/or the like).

With continued reference to FIG. 4, at step 410, process 400 may include transmitting response data associated with a response to receiving initiation data. For example, user device 104 may generate response data associated with a response to receiving initiation data (e.g., data associated with a product identifier of one or more products selected for purchase, data associated with a device identifier of user device 104, data associated with a transaction amount of a transaction, and/or the like). In some non-limiting embodiments or aspects, user device 104 may generate response data associated with a response to initiation data. For example, user device 104 may generate response data associated with a response to receiving initiation data based on user device 104 receiving input. In some non-limiting embodiments or aspects, user device 104 may generate response data associated with a response to receiving initiation data, the response data associated with data such as a unique transaction identifier assigned to the transaction (e.g., based on the generation of a unique transaction identifier by user device 104 and/or merchant device 106). In some non-limiting embodiments or aspects, user device 104 may generate response data associated with a response to initiation based on transaction data associated with a transaction. For example, user device 104 may generate transaction data associated with a transaction based on initiation data. User device 104 may then generate the response data associated with the response based on the transaction data associated with the transaction.

In some non-limiting embodiments or aspects, user device 104 and/or merchant device 106 may store transaction data associated with a transaction in memory of the respective device. For example, upon generation of transaction data associated with a transaction by user device 104, user device 104 and/or merchant device 106 may store the transaction data in memory of user device 104 and/or merchant device 106, respectively.

With continued reference to FIG. 4, at step 412, process 400 may include generating a transaction message associated with a transaction. In some non-limiting embodiments or aspects, user device 104 and/or merchant device 106 may generate a transaction message associated with a transaction. In some non-limiting embodiments or aspects, user device 104 and/or merchant device 106 may generate a transaction message associated with a transaction based on response data associated with a response and/or transaction data associated with a transaction. In some non-limiting embodiments or aspects, a transaction message associated with a transaction may include: transaction data associated with a transaction, a public encryption key of user device 104 and/or merchant device 106, a unique device identifier of user device 104 and/or merchant device 106 (e.g., a public encryption key of user device 104 and/or merchant device 106), and/or the like.

In some non-limiting embodiments or aspects, a transaction message associated with a transaction may be partially and/or completely encrypted. For example, a transaction message associated with a transaction may be partially and/or completely encrypted by user device 104 and/or merchant device 106. In some non-limiting embodiments or aspects, user device 104 may encrypt a transaction message associated with a transaction with a public encryption key of merchant device 106 and/or user device 104. Additionally, or alternatively, in some non-limiting embodiments or aspects, merchant device 106 may encrypt a transaction message with a public encryption key of user device 104 and/or merchant device 106. In some non-limiting embodiments or aspects, user device 104 and/or merchant device 106 may encrypt a transaction message associated with a transaction with a public encryption key of transaction service provider system 110. For example, user device 104 and/or merchant device 106 may receive a public encryption key from transaction service provider system 110 for later encryption of some or all of a transaction message associated with a transaction.

In some non-limiting embodiments or aspects, a transaction message associated with a transaction may be further associated with a public encryption key. For example, user device 104 may associated with a transaction message with a public encryption key of user device 104 (e.g., to identify user device 104 as the device that generated the transaction message). Additionally, or alternatively, in some non-limiting embodiments or aspects, merchant device 106 may associate a transaction message with a public encryption key of merchant device 106 (e.g., to identify merchant device 106 as the device that generated the transaction message). In some non-limiting embodiments or aspects, a transaction message may be stored in memory until communication with transaction service provider system 110 is established. For example, user device 104 and/or merchant device 106 may store a transaction message associated with a transaction in memory of the respective device. In some non-limiting embodiments or aspects, user device 104 and/or merchant device 106 may transmit a transaction message to transaction service provider system 110 based on determining a network communication connection with transaction service provider system 110 has been reestablished.

In some non-limiting embodiments or aspects, a transaction message associated with a transaction may be encrypted to sign the transaction message. For example, user device 104 may encrypt a transaction message associated with a transaction with a private encryption key of user device 104. Additionally, or alternatively, merchant device 106 may encrypt a transaction message associated with a transaction with a private encryption key of merchant device 106.

In some non-limiting embodiments or aspects, some or all of the transaction data associated with a transaction included in a transaction message associated with the transaction may be encrypted. For example, user device 104 and/or merchant device 106 may generate a transaction message associated with a transaction based on initiation data associated with initiation of the transaction and/or transaction data associated with the transaction. In some non-limiting embodiments or aspects, user device 104 and/or merchant device 106 may encrypt some or all of the transaction data associated with the transaction with a public encryption key of user device 104 and/or merchant device 106.

In some non-limiting embodiments or aspects, a transaction message associated with a transaction may include transaction header data associated with a transaction header and/or transaction data associated with a transaction. In some non-limiting embodiments or aspects, user device 104 and/or merchant device 106 may encrypt at least a portion (e.g., some or all) of the transaction header data and/or the transaction data. For example, user device 104 and/or merchant device 106 may encrypt at least a portion of the transaction header data and/or the transaction data with a public encryption key (e.g., a public encryption key of user device 104, merchant device 106, and/or transaction service provider system 110).

With continued reference to FIG. 4, at step 414, process 400 may include determining a network communication connection with transaction service provider system 110 can be established. In some non-limiting embodiments or aspects, user device 104 and/or merchant device 106 may determine that a network communication connection with transaction service provider system 110 cannot be established and/or is not reliable (e.g., "NO" at step 414). For example, user device 104 and/or merchant device 106 may determine that a network communication connection with transaction service provider system 110 cannot be established based on attempts made by user device 104 and/or merchant device 106 to communicate (e.g., transmit and/or receive data via a network communication connection) with transaction service provider system 110. In some non-limiting embodiments or aspects, when user device 104 and/or merchant device 106 determines that a network communication connection with transaction service provider system 110 cannot be established, user device 104 and/or merchant device 106 may continue to determine whether a connection can be established, either periodically or continuously.

With continued reference to FIG. 4, at step 416, process 400 may include transmitting a transaction message associated with a transaction and/or transaction data associated with a transaction. In some non-limiting embodiments or aspects, when user device 104 and/or merchant device 106 determines that a network communication connection with transaction service provider system 110 can be established (e.g., "YES" at step 414) a transaction message associated with a transaction may be transmitted to transaction service provider system 110.

Figure 5:
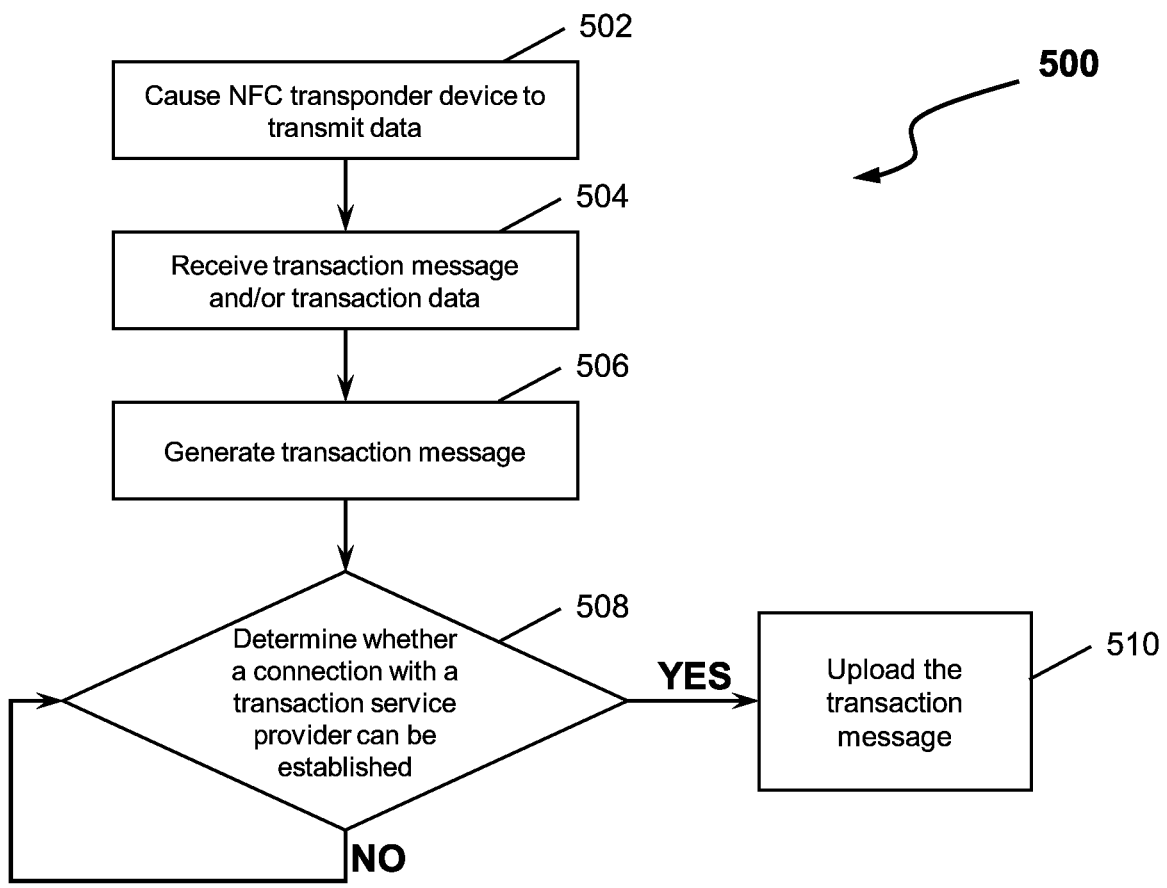
FIG. 5 is a flow diagram of a process for communicating transaction data from an NFC transponder device to a transaction service provider device according to some non-limiting embodiments or aspects.

Referring now to FIG. 5, illustrated is a flow diagram of a process 500 for communicating data between merchant device 106 and NFC transponder device 300. For example, NFC transponder device 300 may transmit data (e.g., transaction data and/or a transaction message) to merchant device 106. In some non-limiting embodiments or aspects, NFC transponder device 300 may transmit data to transaction service provider system 110 via merchant device 106. For example, NFC transponder device 300 may be powered by merchant device 106 (e.g., in response to generation of an electromagnetic field by merchant device 106).

With continued reference to FIG. 5, at step 502, process 500 may include causing NFC transponder device 300 to transmit data. In some non-limiting embodiments or aspects, merchant device 106 may cause NFC transponder device 300 to transmit data via a short range wireless communication connection. For example, merchant device 106 may cause NFC transponder device 300 to transmit one or more transaction messages to merchant device 106. In some non-limiting embodiments or aspects, merchant device 106 may cause NFC transponder device 300 to transmit transaction data associated with one or more transactions to merchant device 106.

With continued reference to FIG. 5, at step 504, process 500 includes receiving data (e.g., receiving one or more transaction messages, receiving transaction data associated with one or more transactions, and/or the like). For example, NFC transponder device 300 may transmit data to merchant device 106. In some non-limiting embodiments or aspects, merchant device 106 may cause an NFC transponder device to transmit data to merchant device 106 based on generating, at merchant device 106, an electromagnetic field to power NFC transponder device 300 to establish a short range wireless communication connection.

With continued reference to FIG. 5, at step 506, process 500 may include generating at least one transaction message associated with at least one transaction. In some non-limiting embodiments or aspects, merchant device 106 may generate at least one transaction message associated with at least one transaction. For example, merchant device 106 may generate at least one transaction message associated with at least one transaction based on receiving data (e.g., one or more transaction messages and/or transaction data associated with one or more transactions) from NFC transponder device 300.

In some non-limiting embodiments or aspects, merchant device 106 may encrypt data. For example, merchant device 106 may encrypt one or more transaction messages and/or transaction data associated with one or more transactions with a public encryption key of merchant device 106 and/or a public encryption key of transaction service provider system 110. In some non-limiting embodiments or aspects, merchant device 106 may store the transaction message and/or the transaction data associated with one or more transactions in memory of merchant device 106. In some non-limiting embodiments or aspects, merchant device 106 may associate a public encryption key of merchant device 106 and/or NFC transponder device 300 with the one or more transaction messages and/or the transaction data. In some non-limiting embodiments or aspects, merchant device 106 may encrypt the one or more transaction messages and/or the transaction data with a public encryption key and/or a private encryption key of NFC transponder device 300 and/or merchant device 106 to sign the one or more transaction messages and/or the transaction data.

With continued reference to FIG. 5, at step 508, process 500 may include determining a network communication connection with transaction service provider system 110 can be established. In some non-limiting embodiments or aspects, merchant device 106 may determine that a network communication connection with transaction service provider system 110 cannot be established (e.g., "NO" at step 508). For example, merchant device 106 may determine that a network communication connection with transaction service provider system 110 cannot be established based on attempts made by merchant device 106 to communicate with transaction service provider system 110. In some non-limiting embodiments or aspects, when merchant device 106 determines that a connection with transaction service provider system 110 cannot be established, merchant device 106 may continue to determine whether a connection can be established, either periodically or continuously.

With continued reference to FIG. 5, at step 510, process 500 may include uploading a transaction message associated with a transaction and/or transaction data associated with a transaction. In some non-limiting embodiments or aspects, when merchant device 106 determines that a network communication connection with transaction service provider system 110 can be established (e.g., "YES" at step 508) merchant device 106 may upload a transaction message associated with a transaction. For example, when merchant device 106 determines that a connection with transaction service provider system 110 can be established, merchant device 106 may upload and/or transmit a transaction message associated with a transaction to transaction service provider system 110.

Figure 6:
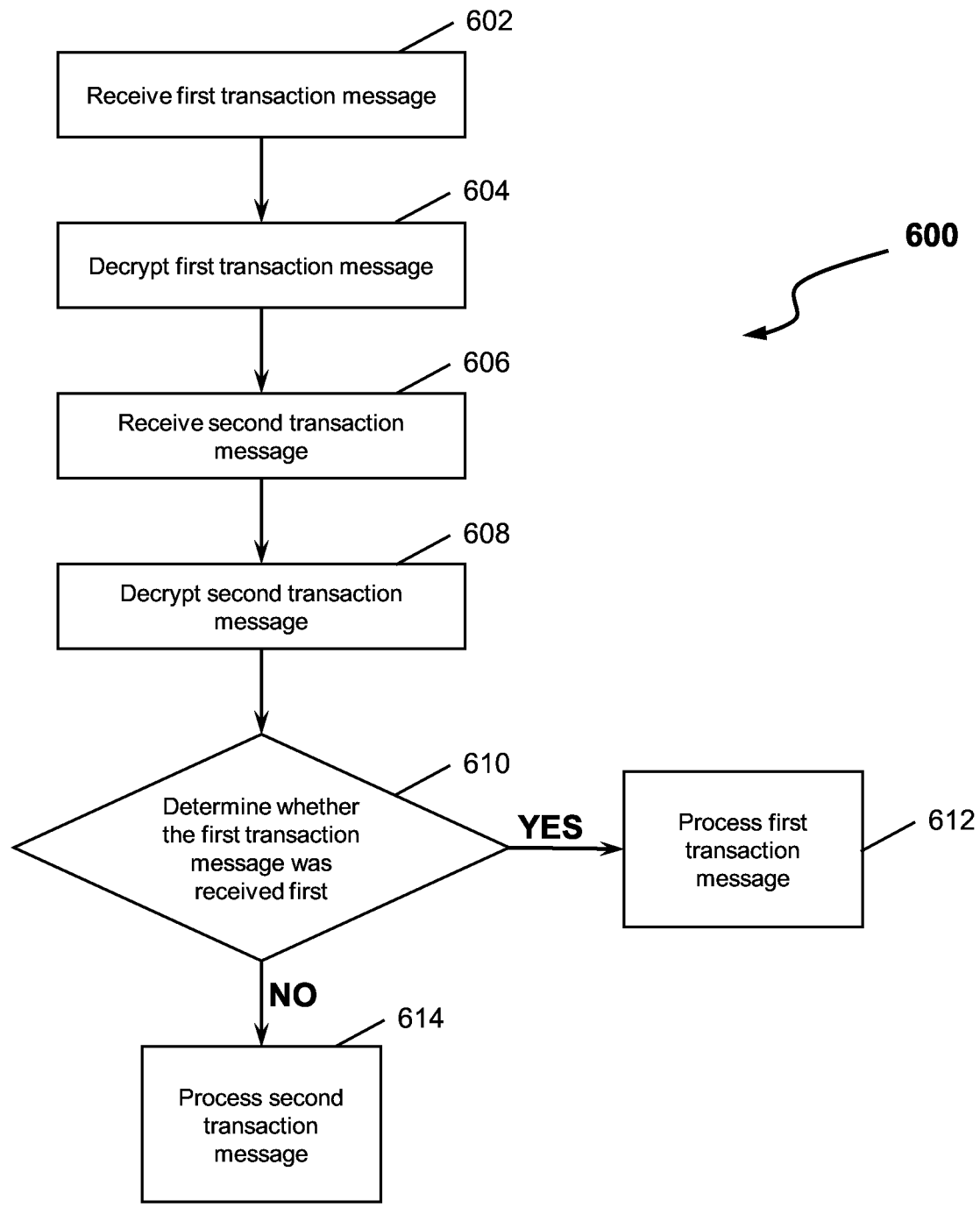
FIG. 6 is a flow diagram of a process for selecting payment transaction data to be processed according to some non-limiting embodiments or aspects.

Referring now to FIG. 6, illustrated is a flow diagram of a process 600 for identifying a transaction message and/or transaction data associated with one or more transactions for processing.

With continued reference to FIG. 6, at step 602, process 600 may include receiving a first transaction message. For example, transaction service provider system 110 may receive the first transaction message from user device 104.

With continued reference to FIG. 6, at step 604, process 600 may include decrypting the first transaction message. In some non-limiting embodiments or aspects, transaction service provider system 110 may decrypt the first transaction message. In some non-limiting embodiments or aspects, transaction service provider system 110 may decrypt a first transaction message based on determining one or more public encryption keys and/or private encryption keys. For example, transaction service provider system 110 may determine one or more public encryption keys and/or one or more private encryption keys of one or more devices that encrypted the first transaction message (e.g., based on one or more unique device identifiers included in header data of the first transaction message).

With continued reference to FIG. 6, at step 606, process 600 may include receiving a second transaction message. For example, transaction service provider system 110 may receive the second transaction message from merchant device 106.

With continued reference to FIG. 6, at step 608, process 600 may include decrypting the second transaction message. In some non-limiting embodiments or aspects, transaction service provider system 110 may decrypt a second transaction message. For example, transaction service provider system 110 may decrypt a second transaction message based on determining one or more private encryption keys and/or one or more public encryption keys. In some non-limiting embodiments or aspects, transaction service provider system 110 may determine one or more public encryption keys and/or one or more private encryption keys of one or more devices that encrypted the second transaction message (e.g., based on one or more unique device identifiers included in header data of the first transaction message).

With continued reference to FIG. 6, at step 610, process 600 may include determining whether the first transaction message is received first. For example, transaction service provider system 110 may determining whether the first transaction message is received first. In some non-limiting embodiments or aspects, transaction service provider system 110 may determine that a transaction message is received first. For example, transaction service provider system 110 may assign a timestamp to a first transaction message and a second transaction message when the first transaction message and the second transaction message are received by transaction service provider system 110. Transaction service provider system 110 may determine which of the first transaction message or the second transaction message is received first based on each of the timestamps.

With continued reference to FIG. 6, at step 612, process 600 may include processing a first transaction message. For example, transaction service provider system 110 may process the first transaction message. In some non-limiting embodiments or aspects, transaction service provider system 110 may process the first transaction message based on determining that the first transaction message is received before a second transaction message associated with the one or more transactions is received.

With continued reference to FIG. 6, at step 614, process 600 may include processing a second transaction message. For example, transaction service provider system 110 may process the second transaction message. In some non-limiting embodiments or aspects, transaction service provider system 110 may process the second transaction message based on determining that the second transaction message is received before a first transaction message associated with the one or more transactions is received. In some non-limiting embodiments or aspects, transaction service provider system 110 may determine that the first transaction message or the second transaction message is received first based on determining that the other was not received.

Figure 7:
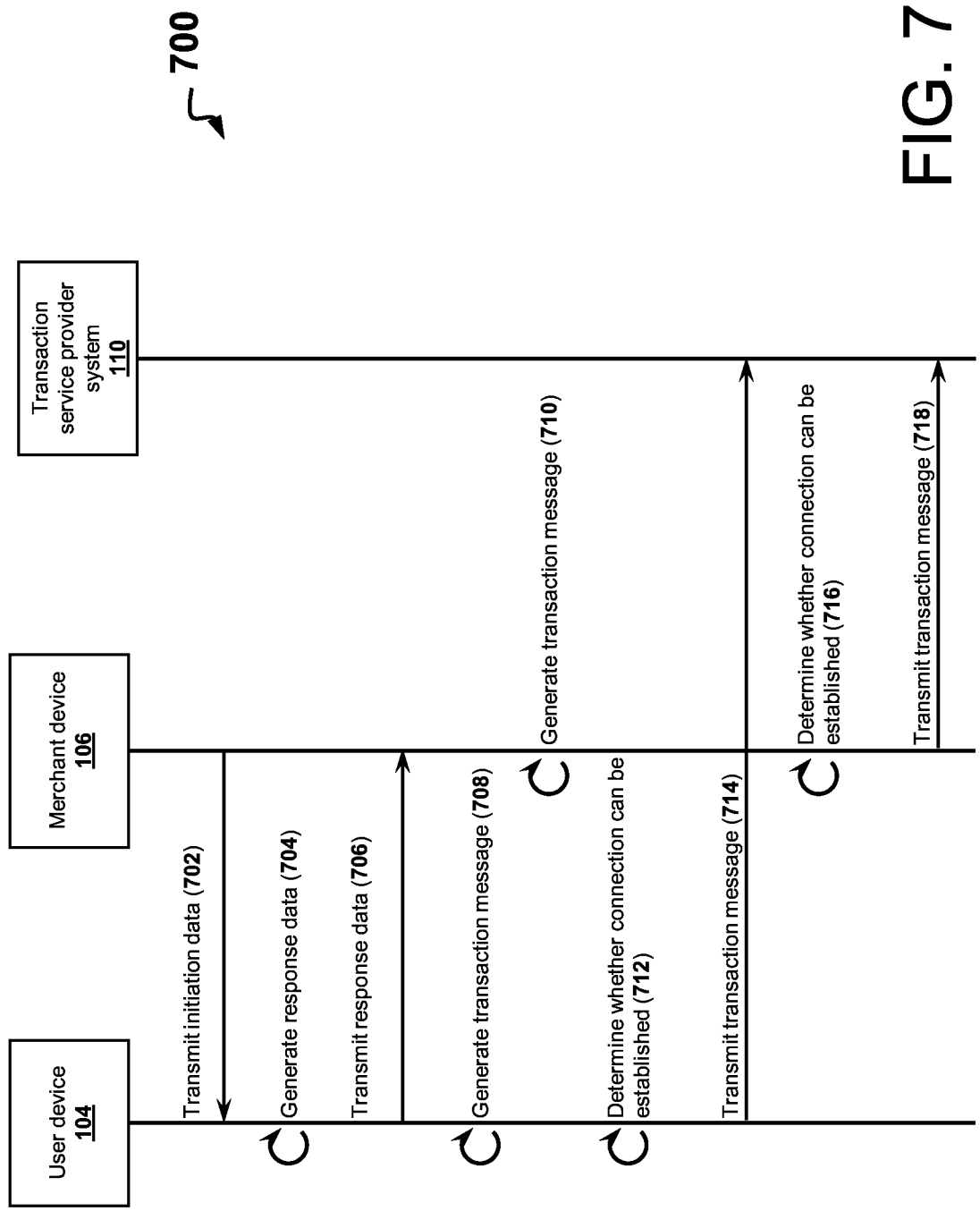
FIG. 7 is a diagram of an implementation of some non-limiting embodiments or aspects of a process shown in FIG. 4.

Referring now to FIG. 7, illustrated is a non-limiting example of an implementation 700 of a process for exchanging transaction data. As shown by reference number 702 in FIG. 7, merchant device 106 may transmit initiation data associated with initiation of a transaction to user device 104. In some non-limiting embodiments or aspects, merchant device 106 may transmit the initiation data associated with initiation of the transaction based on determining that a network communication connection with transaction service provider system 110 cannot be established.

In some non-limiting embodiments or aspects, a determination may be made that a network communication connection with transaction service provider system 110 cannot be established. For example, user device 104 and/or merchant device 106 may determine that a network communication connection with transaction service provider system 110 cannot be established where user device 104 and/or merchant device 106 are unable to communicate via a network communication connection with transaction service provider system 110.

In some non-limiting embodiments or aspects, user device 104 may generate transaction data associated with a transaction. For example, user device 104 may generate transaction data associated with a transaction, initiation data associated with initiation of a transaction and/or a public encryption key of user device 104. In some non-limiting embodiments or aspects, user device 104 may store transaction data associated with a transaction in memory of user device 104. Additionally, or alternatively, user device 104 may generate transaction data associated with a transaction based on user device 104 receiving user input (e.g., input from a user associated with a selection of one or more products for purchase).

As shown by reference number 704 in FIG. 7, user device 104 may generate response data associated with a response. For example, user device 104 may generate response data associated with a response based on transaction data associated with a transaction, initiation data associated with initiation of a transaction, and/or a public encryption key of user device 104, merchant device 106, and/or transaction service provider system 110. In some non-limiting embodiments or aspects, user device 104 may store response data associated with a response in memory of user device 104. Additionally, or alternatively, user device 104 may generate response data associated with a response based on user device 104 receiving user input (e.g., input from a user associated with a selection of one or more goods and/or services for purchase).

As shown by reference number 706 in FIG. 7, response data associated with a response may be transmitted via a short range wireless communication connection. In some non-limiting embodiments or aspects, user device 104 may transmit response data associated with a response. For example, user device 104 may transmit response data associated with a response to merchant device 106. In some non-limiting embodiments or aspects, user device 104 may transmit response data associated with a response to merchant device 106 based on user device 104 generating the response data associated with a response and/or based on user device 104 determining a network communication connection cannot be established with transaction service provider system 110.

As shown by reference number 708 in FIG. 7, a transaction message associated with a transaction may be generated. In some non-limiting embodiments or aspects, user device 104 may generate a transaction message associated with a transaction. For example, user device 104 may generate a transaction message associated with a transaction (e.g., a user transaction message associated with a transaction) based on transaction data associated with the transaction and/or response data associated with a response. Additionally, in some non-limiting embodiments or aspects, user device 104 may generate a transaction message associated with a transaction based on a public encryption key. For example, user device 104 may generate a transaction message associated with a transaction by encrypting some or all of the transaction message associated with the transaction (e.g., with a public encryption key of user device 104, merchant device 106, and/or transaction service provider system 110).

As shown by reference number 710 in FIG. 7, a transaction message associated with a transaction may be generated. In some non-limiting embodiments or aspects, merchant device 106 may generate a transaction message associated with a transaction. For example, merchant device 106 may generate a transaction message associated with a transaction based on transaction data associated with the transaction and/or response data associated with a response. In some non-limiting embodiments or aspects, merchant device 106 may generate a transaction message associated with a transaction based on receiving transaction data associated with a transaction. For example, merchant device 106 may generate a transaction message associated with a transaction based on receiving transaction data associated with a transaction from user device 104. In some non-limiting embodiments or aspects, merchant device 106 may generate a transaction message associated with a transaction based on a public encryption key. For example, merchant device 106 may generate a transaction message associated with a transaction by encrypting some or all of the transaction message associated with the transaction (e.g., with a public encryption key of user device 104, merchant device 106, and/or transaction service provider system 110).

In some non-limiting embodiments or aspects, a transaction message associated with a transaction may include transaction header data associated with a transaction header and/or transaction data associated with a transaction. For example, transaction header data associated with transaction header may include a unique transaction identifier, a transaction amount, one or more product identifiers (e.g., one or more identifiers of a product), an identifier of user device 104 (e.g., an identifier of a user associated with user device 104, an identifier of a buyer associated with user device 104, and/or the like), an identifier of merchant device 106 (e.g., an identifier of a merchant associated with merchant device 106), an identifier of merchant system 108 (e.g., an identifier of a merchant associated with merchant system 108), and/or an identifier of NFC transponder device 300 (e.g., an identifier of a merchant associated with NFC transponder device 300). In some non-limiting embodiments or aspects, transaction data associated with a transaction may include data associated with a unique transaction identifier, data associated with a transaction amount, one or more product identifiers, data associated with an identifier of user device 104, and/or data associated with an identifier of a merchant, merchant device 106, merchant system 108, and/or NFC transponder device 300 associated with a merchant, data associated with a payment account, and/or the like.

In some non-limiting embodiments or aspects, user device 104 and/or merchant device 106 may encrypt a transaction message associated with a transaction prior to transmission of the transaction message. For example, user device 104 and/or merchant device 106 may encrypt a transaction message associated with a transaction with a public encryption key (e.g., a public encryption key of user device 104, merchant device 106, and/or transaction service provider system 110). In some non-limiting embodiments or aspects, user device 104 and/or merchant device 106 may encrypt a transaction message with a private encryption key of user device 104 or merchant device 106, respectively, to digitally sign the transaction message.

In some non-limiting embodiments or aspects, user device 104 and/or merchant device 106 may encrypt at least a portion of a transaction message associated with a transaction with a public encryption key (e.g., a public encryption key of user device 104, merchant device 106, and/or transaction service provider system 110). For example, user device 104 and/or merchant device 106 may encrypt at least a portion of a transaction message (e.g., transaction header data associated with a transaction header, transaction data associated with a transaction, and/or the like) with a public encryption key (e.g., a public encryption key of user device 104, merchant device 106, and/or transaction service provider system 110). For example, user device 104 and/or merchant device 106 may encrypt at least a portion of a transaction message (e.g., transaction header data associated with a transaction header, transaction data associated with a transaction, and/or the like) with a private encryption key (e.g., a private encryption key of user device 104 or merchant device 106) to digitally sign the at least a portion of the transaction message.

As shown by reference number 712 in FIG. 7, user device 104 may determine that a connection with transaction service provider system 110 can be established. For example, user device 104 may determine that a connection with transaction service provider system 110 can be established based on reestablishing a connection between user device 104 and transaction service provider system 110.

As shown by reference number 714 in FIG. 7, a transaction message associated with a transaction may be transmitted. For example, user device 104 may transmit a transaction message via a network communication connection to transaction service provider system 110. In such examples, user device 104 may transmit a transaction message to a transaction service provider system based on determining a network communication connection with transaction service provider system 110 can be established.

As shown by reference number 716 in FIG. 7, merchant device 106 may determine that a connection with transaction service provider system 110 can be established. For example, merchant device 106 may determine that a connection with transaction service provider system 110 can be established based on determining a network communication connection with transaction service provider system 110 can be established.

As shown by reference number 718 in FIG. 7, merchant device 106 may transmit a transaction message to transaction service provider system 110. For example, merchant device 106 may transmit a transaction message to transaction service provider system 110 based on determining a network communication connection with the transaction service provider system can be established.

Figure 8:
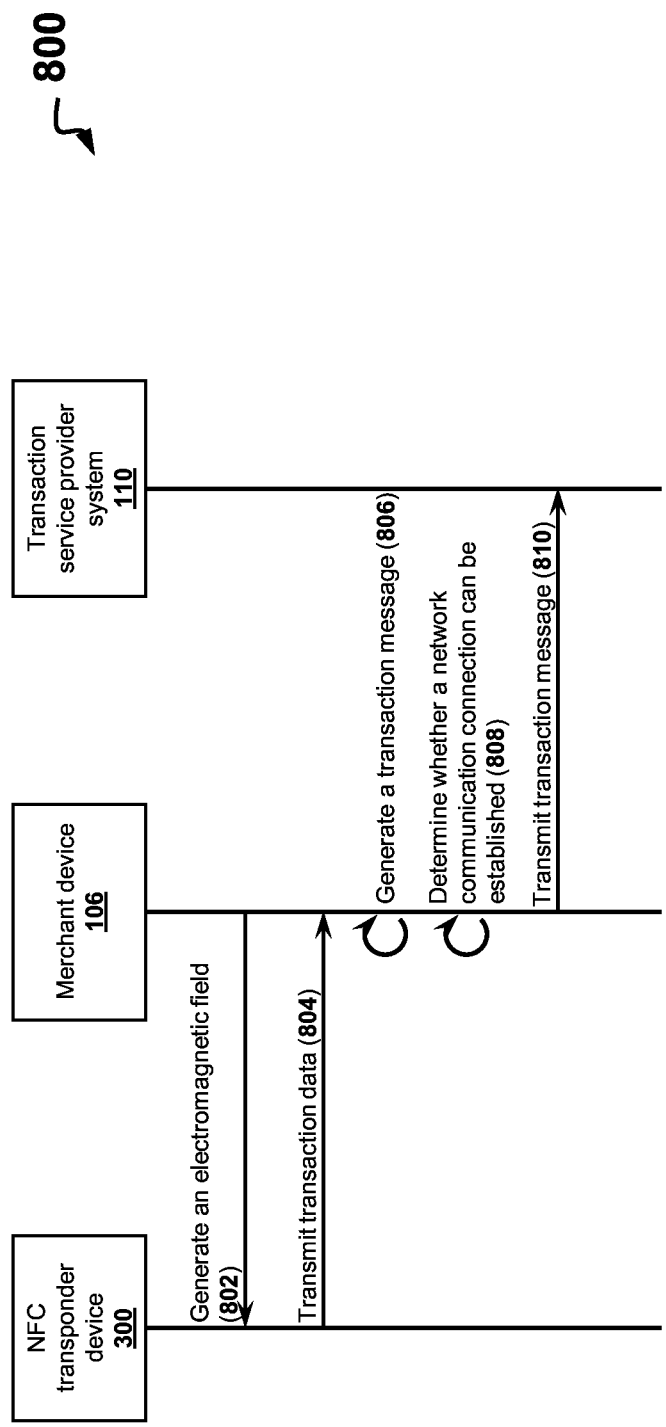
FIG. 8 is a diagram of an implementation of some non-limiting embodiments or aspects of a process shown in FIG. 5.

Referring now to FIG. 8, illustrated is a non-limiting example of an implementation 800 of a process for communicating transaction data associated with a transaction and/or a transaction message associated with a transaction.

As shown by reference number 802 in FIG. 8, a device may be caused to transmit transaction data associated with one or more transactions via a short range wireless communication connection. For example, merchant device 106 may generate an electromagnetic field to cause NFC transponder device 300 to transmit transaction data associated with one or more transactions to merchant device 106. In some non-limiting embodiments or aspects, NFC transponder device 300 may have stored in the memory therein transaction data associated with one or more transactions. In some non-limiting embodiments or aspects, one or more transaction messages may include transaction header data associated with one or more transaction headers and/or transaction data associated with one or more transactions. Additionally or alternatively, one or more transaction messages may include one or more public encryption keys to encrypt the transaction data associated with the one or more transactions. In some non-limiting embodiments or aspects, the one or more public encryption keys (e.g., a public encryption key of user device 104 and/or merchant device 106) may be used to identify one or more devices that were used to encrypt the transaction data associated with the one or more transactions.

As shown by reference number 804 in FIG. 8, a device may transmit transaction data associated with one or more transactions. In some non-limiting embodiments or aspects, NFC transponder device 300 may transmit transaction data associated with one or more transactions. For example, NFC transponder device 300 may transmit transaction data associated with one or more transactions to merchant device 106 based on merchant device 106 (e.g., in response to generation of a magnetic field by merchant device 106).

As shown by reference number 806 in FIG. 8, a transaction message may be generated. In some non-limiting embodiments or aspects, merchant device 106 may generate a transaction message. For example, merchant device 106 may generate a transaction message based on transaction data associated with one or more transactions. In some non-limiting embodiments or aspects, merchant device 106 may generate a transaction message based on transaction data associated with one or more transactions received from NFC transponder device 300. In some non-limiting embodiments or aspects, merchant device 106 may encrypt a transaction message. For example, merchant device 106 may encrypt a transaction message with a public encryption key of merchant device 106, transaction service provider system 110, user device 104, and/or the like. In some non-limiting embodiments or aspects, NFC transponder device 300 may receive a public encryption key of merchant device 106, transaction service provider system 110, and/or user device 104 prior to communicating with merchant device 106.

As shown by reference number 808 in FIG. 8, a determination may be made that a network communication connection with transaction service provider system 110 is established. In some non-limiting embodiments or aspects, a merchant device 106 may determine that a network communication connection with transaction service provider system 110 can be established.

As shown by reference number 810 in FIG. 8, a transaction message may be transmitted via a network communication connection. In some non-limiting embodiments or aspects, a transaction message may be transmitted by merchant device 106 to transaction service provider system 110 via a network communication connection. For example, a transaction message may be transmitted by merchant device 106 to transaction service provider system 110 based on the determination by merchant device 106 that a network communication connection can be established with transaction service provider system 110.

Figure 9:
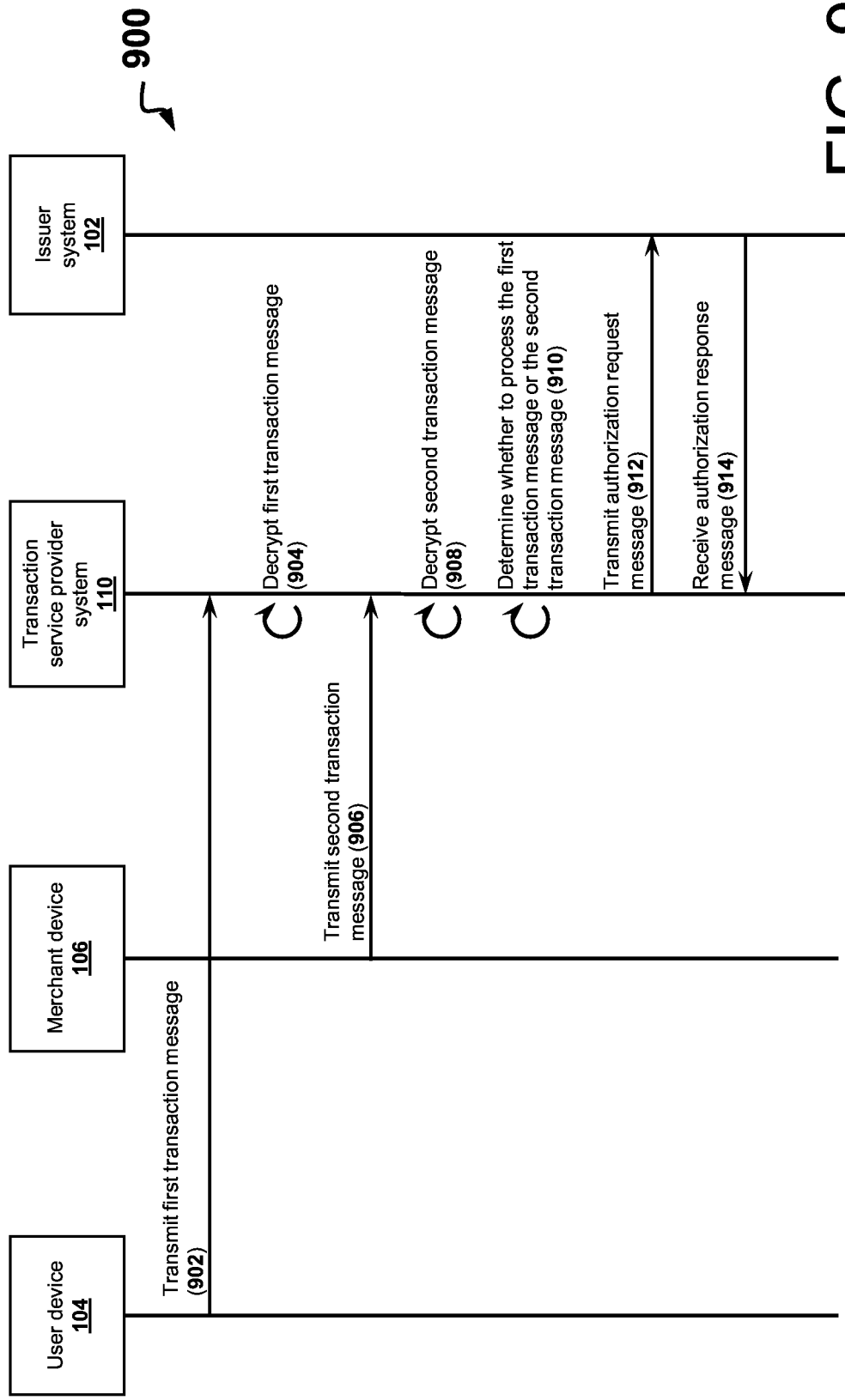
FIG. 9 is a diagram of an implementation of some non-limiting embodiments or aspects of a process shown in FIG. 6.

Referring now to FIG. 9, illustrated is a non-limiting example of an implementation 900 of a process for processing one or more transaction messages.

As shown by reference number 902 in FIG. 9, user device 104 may transmit a first transaction message associated with a transaction via a network communication connection. For example, user device 104 may transmit a first transaction message associated with a transaction to transaction service provider system 110 via a network communication connection. In some non-limiting embodiments or aspects, transaction service provider system 110 may store a first transaction message associated with a transaction in a database.

As shown by reference number 904 in FIG. 9, transaction service provider system 110 may decrypt a first transaction message associated with a transaction based on determining user device 104 and/or merchant device 106 encrypted the first transaction message. For example, transaction service provider system 110 may determine a private encryption key of user device 104 and/or merchant device 106 to use to decrypt the first transaction message associated with a transaction. In some non-limiting embodiments or aspects, transaction service provider system 110 may determine a private encryption key to use to decrypt a transaction message associated with a transaction based on transaction header data associated with a transaction header.

As shown by reference number 906 in FIG. 9, merchant device 106 may transmit a second transaction message associated with a transaction via a network communication connection to transaction service provider system 110. In some non-limiting embodiments or aspects, transaction service provider system 110 may store the second transaction message associated with the transaction in a database.

As shown by reference number 908 in FIG. 9, transaction service provider system 110 may decrypt the second transaction message associated with a transaction based on determining merchant device 106 and/or user device 104 encrypted the transaction message. For example, transaction service provider system 110 may determine a private encryption key of merchant device 106 and/or user device 104 to use to decrypt the first transaction message associated with a transaction. In some non-limiting embodiments or aspects, transaction service provider system 110 may determine a private encryption key to use to decrypt a transaction message associated with a transaction based on a transaction header data associated with a transaction header.

As shown by reference number 910 in FIG. 9, a determination may be made to process a first transaction message associated with a transaction or a second transaction message associated with a transaction. In some non-limiting embodiments or aspects, transaction service provider system 110 may determine to process a first transaction message associated with a transaction or a second transaction message associated with a transaction. For example, transaction service provider system 110 may determine to process a first transaction message associated with a transaction or a second transaction message associated with a transaction based on which transaction message is associated with an earlier timestamp.

As shown by reference number 912 in FIG. 9, an authorization request message may be transmitted to issuer system 102. In some non-limiting embodiments or aspects, transaction service provider system 110 may transmit an authorization request message to an issuer system 102. For example, transaction service provider system 110 may transmit an authorization request message to an issuer system 102 based on determining which transaction message (e.g., a first transaction message or a second transaction message) to process. In some non-limiting embodiments or aspects, transaction service provider system 110 may generate an authorization request message based on receiving the transaction message at transaction service provider system 110.

As shown by reference 914 in FIG. 9, an authorization response message may be received. In some non-limiting embodiments or aspects, transaction service provider system 110 may receive an authorization response message from issuer system 102.

Figure 10:
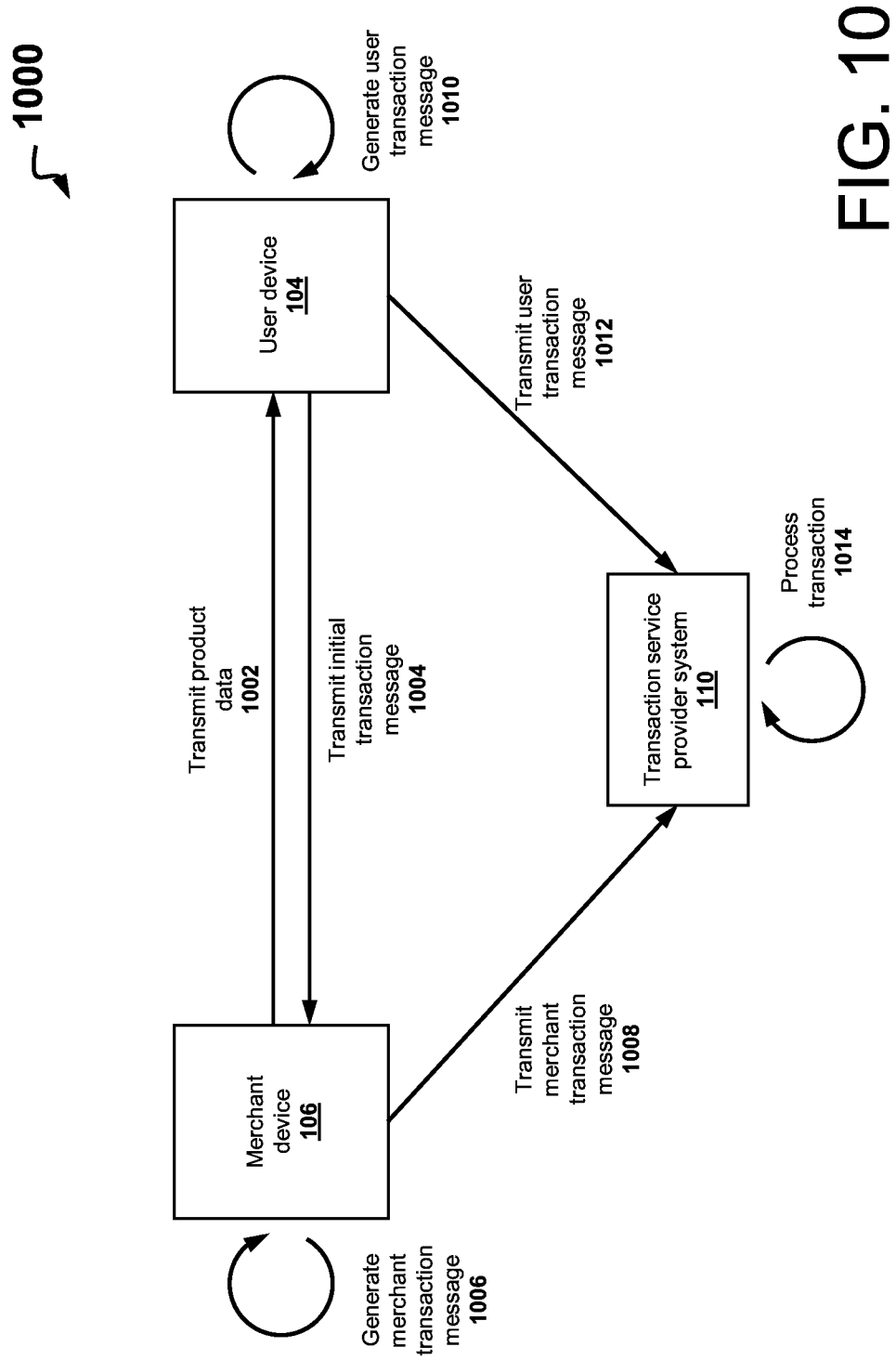
FIG. 10 is a diagram of an implementation of some non-limiting embodiments or aspects of a process shown in FIG. 4.

Referring now to FIG. 10, illustrated is a non-limiting example of an implementation 1000 of a process for exchanging transaction data.

As shown by reference number 1002 in FIG. 10, merchant device 106 may transmit product data associated with a product to user device 104. For example, merchant device 106 may transmit product data associated with the product to user device 104 based on receiving a request for the product data from user device 104 for the product data. The product may be a product that is to be involved in a transaction involving a consumer (e.g., a buyer) associated with user device 104 and a merchant (e.g., a seller) associated with merchant device 106. In some non-limiting embodiments or aspects, merchant device 106 may transmit the product data to user device 104 and user device 104 may receive the product data based on user device 104 establishing a communication connection (e.g., a short range wireless communication connection) between merchant device 106 and user device 104. In some non-limiting embodiments or aspects, the product data may include data associated with a price for one or more products, data associated with product details for one or more products, and/or data associated with a merchant identifier of merchant device 106 (e.g., an identifier of a merchant associated with merchant device 106, a token for an identifier of a merchant associated with merchant device 106, and/or the like). In some non-limiting embodiments or aspects, merchant device 106 may transmit a product message that includes the product data associated with the product to user device 104.

As shown by reference number 1004 of FIG. 10, user device 104 may transmit an initial transaction message to merchant device 106. For example, user device 104 may transmit an initial transaction message to merchant device 106 via a short range wireless communication connection. The initial transaction message may be based on the transaction involving the consumer associated with user device 104 and the merchant associated with merchant device 106. For example, user device 104 may generate the initial transaction message based on transaction data associated with the transaction involving the consumer and the merchant. In some non-limiting embodiments or aspects, the initial transaction message may include a transaction header section and a transaction detail section. In some non-limiting embodiments or aspects, the transaction header section may include transaction header data associated with a transaction header. The transaction header data may include a transaction identifier of the transaction (e.g., a unique identifier of the transaction), an amount of the transaction, a product identifier of a product involved in the transaction, and/or a user identifier of user device 104 (e.g., an identifier of a consumer associated with user device 104, a token for an identifier of the consumer associated with user device 104, and/or the like). In some non-limiting embodiments or aspects, the transaction detail section may include transaction detail data associated with details of the transaction. The transaction detail data may include the transaction identifier of the transaction, the amount of the transaction, the product identifier of the product involved in the transaction, and/or the merchant identifier of merchant device 106.

In some non-limiting embodiments or aspects, user device 104 may encrypt the transaction detail data included in the initial transaction message before transmitting the initial transaction message to merchant device 106. For example, user device 104 may encrypt the transaction detail data of the initial transaction message using a public encryption key of user device 104 before transmitting the initial transaction message to merchant device 106. In some non-limiting embodiments or aspects, the public encryption key of user device 104 may be a public encryption key assigned to the consumer associated with user device 104 and/or assigned to user device 104. In some non-limiting embodiments or aspects, the public encryption key of user device 104 may be generated by user device 104. In some non-limiting embodiments or aspects, the public encryption key of user device 104 may be generated and assigned to user device 104 by transaction service provider system 110 prior to or during the transaction.

As shown by reference number 1006 in FIG. 10, merchant device 106 may generate a merchant transaction message. For example, merchant device 106 may generate a merchant transaction message based on receiving the initial transaction message from user device 104. In some non-limiting embodiments or aspects, merchant device 106 may generate the merchant transaction message by updating the initial transaction message such that the transaction header section of the initial transaction message includes the merchant identifier of merchant device 106. In some non-limiting embodiments or aspects, merchant device 106 may encrypt the merchant transaction message using a public encryption key of transaction service provider system 110 based on updating the initial transaction message.

As shown by reference number 1008 in FIG. 10, merchant device 106 may transmit the merchant transaction message (e.g., the encrypted merchant transaction message) to transaction service provider system 110. For example, merchant device 106 may transmit the merchant transaction message to transaction service provider system 110 based on generating the merchant transaction message.

As shown by reference number 1010 in FIG. 10, user device 104 generates a user transaction message. For example, user device 104 may generate a user transaction message based on receiving the product data from merchant device 106. In another example, user device 104 may generate the user transaction message based on generating the initial transaction message. In some non-limiting embodiments or aspects, user device 104 may generate the user transaction message by updating the initial transaction message such that the transaction header section of the initial transaction message includes the merchant identifier of merchant device 106. In some non-limiting embodiments or aspects, user device 104 may encrypt the user transaction message with the public encryption key of transaction service provider system 110 updating the initial transaction message.

As shown by reference number 1012 in FIG. 10, user device 104 transmits the user transaction message (e.g., the encrypted user transaction message) to transaction service provider system 110. For example, user device 104 may transmit the user transaction message to transaction service provider system 110 based on generating the user transaction message.

As shown by reference number 1014 in FIG. 10, transaction service provider system 110 may process the transaction. For example, transaction service provider system 110 may process the transaction based on the merchant transaction message or the user transaction message. As part of processing the transaction, transaction service provider system 110 may decrypt the merchant transaction message with a private encryption key of transaction service provider system 110. Transaction service provider system 110 may decrypt the transaction detail data included in the merchant transaction message using a private encryption key of user device 104. For example, transaction service provider system 110 may retrieve the private encryption key of user device 104 by performing a lookup of the private encryption key of user device 104. In such an example, transaction service provider system 110 may maintain a database that stores the private encryption key in association with user device 104 (e.g., assigned to user device 104, in association with a user of user device 104, and/or the like). Transaction service provider system 110 may perform the lookup of the private encryption key of user device 104 based on the user identifier included in the transaction header data of the merchant transaction message. Transaction service provider system 110 may decrypt the transaction detail data using the private encryption key of user device 104.

In some non-limiting embodiments or aspects, as part of processing the transaction, transaction service provider system 110 may decrypt the user transaction message with the private encryption key of transaction service provider system 110. In some non-limiting embodiments or aspects, transaction service provider system 110 may decrypt the transaction detail data included in the user transaction message with the private encryption key of user device 104.

In some non-limiting embodiments or aspects, transaction service provider system 110 may validate the transaction based on the merchant transaction message and/or the user transaction message. For example, transaction service provider system 110 may validate the transaction based on the merchant identifier and/or the transaction identifier included in the merchant transaction message. Additionally or alternatively, transaction service provider system 110 may validate the transaction based on the merchant identifier and/or the transaction identifier included in the user transaction message.

In some non-limiting embodiments or aspects, transaction service provider system 110 may compare the merchant identifier included in the transaction header data of the merchant transaction message to the merchant identifier included in the transaction detail data of the merchant transaction message. Additionally or alternatively, transaction service provider system 110 may compare the transaction identifier included in the transaction header data of the merchant transaction message to the transaction identifier included in the transaction detail data of the merchant transaction message.

If transaction service provider system 110 determines that the merchant identifier included in the transaction header data of the merchant transaction message corresponds to (e.g., matches) the merchant identifier included in the transaction detail data of the merchant transaction message and/or that the transaction identifier included in the transaction header data of the merchant transaction message corresponds to the transaction identifier included in the transaction detail data of the merchant transaction message, transaction service provider system 110 may validate the transaction. If transaction service provider system 110 determines that the merchant identifier included in the transaction header data of the merchant transaction message does not correspond to the merchant identifier included in the transaction detail data of the merchant transaction message and/or that the transaction identifier included in the transaction header data of the merchant transaction message does not correspond to the transaction identifier included in the transaction detail data of the merchant transaction message, transaction service provider system 110 may not validate the transaction.

In some non-limiting embodiments or aspects, transaction service provider system 110 may compare the merchant identifier included in the transaction header data of the user transaction message to the merchant identifier included in the transaction detail data of the user transaction message. Additionally or alternatively, transaction service provider system 110 may compare the transaction identifier included in the transaction header data of the user transaction message to the transaction identifier included in the transaction detail data of the user transaction message.

If transaction service provider system 110 determines that the merchant identifier included in the transaction header data of the user transaction message corresponds to the merchant identifier included in the transaction detail data of the user transaction message and/or that the transaction identifier included in the transaction header data of the user transaction message corresponds to the transaction identifier included in the transaction detail data of the user transaction message, transaction service provider system 110 may validate the transaction. If transaction service provider system 110 determines that the merchant identifier included in the transaction header data of the user transaction message does not correspond to the merchant identifier included in the transaction detail data of the user transaction message and/or that the transaction identifier included in the transaction header data of the user transaction message does not correspond to the transaction identifier included in the transaction detail data of the user transaction message, transaction service provider system 110 may not validate the transaction.

In some non-limiting embodiments or aspects, transaction service provider system 110 may validate the transaction based on the user transaction message by comparing the merchant identifier included in the transaction header data of the user transaction message to the merchant identifier included in the transaction detail data of the user transaction message. If transaction service provider system 110 determines that the merchant identifier included in the transaction header data of the user transaction message corresponds to the merchant identifier included in the transaction detail data of the user transaction message, transaction service provider system 110 may validate the transaction. If transaction service provider system 110 determines that the merchant identifier included in the transaction header data of the user transaction message does not correspond to the merchant identifier included in the transaction detail data of the user transaction message, transaction service provider system 110 may not validate the transaction.

In some non-limiting embodiments or aspects, transaction service provider system 110 may determine whether to validate the transaction based on the merchant transaction message or the user transaction message based on which of the merchant transaction message or the user transaction message was received first by transaction service provider system 110. In some non-limiting embodiments or aspects, transaction service provider system 110 may determine an account identifier associated with an account of the merchant involved in the transaction and/or an account identifier associated with an account of the consumer involved in the transaction based on validating the transaction. In some non-limiting embodiments or aspects, transaction service provider system 110 may complete the transaction based on validating the transaction or transaction service provider system 110 may not complete the transaction based on not validating the transaction.

In some non-limiting embodiments or aspects, transaction service provider system 110 may complete the transaction by transmitting an authorization request message and receiving an authorization response message, where the authorization response message includes an indication of whether the transaction was approved or declined by an issuer system (e.g., issuer system 102) that issued an account of the consumer involved in the transaction.

In some non-limiting embodiments or aspects, transaction service provider system 110 may generate the authorization request message based on transaction detail data (e.g., the transaction detail data included in the merchant transaction message or the transaction detail data included in the user transaction message). The authorization request message may be generated based on the merchant transaction message, the user transaction message, or the merchant transaction message and the user transaction message. In some non-limiting embodiments or aspects, transaction service provider system 110 may transmit the authorization request message. For example, transaction service provider system 110 may transmit the authorization request message to issuer system 102.

In some non-limiting embodiments or aspects, transaction service provider system 110 may receive an authorization response message indicating that a transaction is approved or declined (e.g., by issuer system 102, and/or the like). In some non-limiting embodiments or aspects, transaction service provider system 110 may generate a confirmation message based on the authorization response message. For example, transaction service provider system 110 may generate the confirmation message to indicate that the transaction was approved or declined based on the indication that the transaction was approved or declined included in the authorization response message. In some non-limiting embodiments or aspects, transaction service provider system 110 may transmit the confirmation message to merchant device 106 and/or user device 104 to notify the merchant associated with merchant device 106 and/or the consumer associated with user device 104 that the transaction was approved or declined.

Although non-limiting embodiments or aspects have been described in detail for the purpose of illustration based on what are currently considered to be the most practical and preferred embodiments or aspects, it is to be understood that such detail is provided solely for that purpose and that the present disclosure should not be limited to the disclosed embodiments. On the contrary, the present disclosure is intended to cover modifications and equivalent arrangements that are within the spirit and scope of the appended claims. For example, it is to be understood that the present disclosure contemplates that, to the extent possible, one or more features of any embodiments can be combined with one or more features of any other embodiment.

What is claimed is:

1. A method, comprising:
storing, with an integrated circuit associated with a near field communication (NFC) transponder, a first public encryption key of a merchant device associated with a merchant for use as a unique device identifier of the merchant device in a memory of the integrated circuit, wherein the NFC transponder comprises an antenna and the integrated circuit, wherein the integrated circuit is powered by an electromagnetic field generated by a user device associated with a user or the merchant device associated with the merchant, and wherein the integrated circuit is configured to read from, write to, and/or delete data from the memory based on communicating via an NFC connection,
wherein the memory comprises a first predefined region comprising a secure region, a second predefined region comprising a merchant data region, and a third predefined region comprising a transaction data region, wherein the first public encryption key is stored in the secure region, and wherein merchant data associated the merchant is stored in the merchant data region;
limiting communication of data to and/or from the secure region of the memory to the merchant device, wherein limiting communication of data to and/or from the secure region of the memory to the merchant device comprises:
preventing data from being read from or written to the secure region of the memory based on communication with a device that is not associated with the merchant;
limiting communication of data from the merchant data region of the memory to the user device, wherein limiting communication of data from the merchant data region of the memory to the user device comprises:
permitting the user device to read data from the merchant data region, preventing the user device from writing data to the merchant data region, and allowing the merchant device to write data to the merchant data region; and
limiting communication of data to the transaction data region of the memory to the merchant device, wherein limiting communication of data to the transaction data region of the memory to the merchant device comprises:
permitting the merchant device to read data from the merchant data region, preventing the merchant device from writing data to the transaction data region, and allowing the user device to write data to the transaction data region;
retrieving, with the integrated circuit, the first public encryption key of the merchant device from the secure region of the memory;
retrieving, with the integrated circuit, the merchant data associated with the merchant from the merchant data region of the memory;
transmitting, with the integrated circuit, the first public encryption key of the merchant device and the merchant data to the user device via the antenna of the NFC transponder and a first NFC connection, wherein the first NFC connection is between the user device and the NFC transponder;
receiving, with the integrated circuit and from the user device, a second public encryption key of the user device for use as a unique device identifier of the user device and transaction data associated with a transaction between the merchant and the user via the antenna of the NFC transponder and the first NFC connection, wherein the transaction data associated with the transaction between the merchant and the user comprises the first public encryption key of the merchant device and the merchant data;
appending, with the integrated circuit, the second public encryption key and the transaction data associated with the transaction to a database stored in the memory in response to receiving the second public encryption key and the transaction data associated with the transaction via the NFC connection, wherein appending the second public encryption key and the transaction data associated with the transaction to the memory comprises:
storing, with the integrated circuit and based on receiving the second public encryption key from the user device, the second public encryption key and the transaction data associated with the transaction in the transaction data region of the memory; and
transmitting, with the integrated circuit, the second public encryption key and the transaction data associated with the transaction to the merchant device via a second NFC connection, wherein the second NFC connection is between the merchant device and the NFC transponder.

2. The method of claim 1, wherein receiving the second public encryption key and the transaction data associated with the transaction via the antenna of the NFC transponder and the first NFC connection comprises:
receiving a payment token associated with a payment account for the user associated with the user device.

3. A transponder device, comprising:
an integrated circuit configured to:
store a first public encryption key of a merchant device associated with a merchant for use as a unique device identifier of the merchant device in a memory of the integrated circuit, wherein a near field communication (NFC) transponder comprises an antenna, wherein the integrated circuit is powered by an electromagnetic field generated by a user device associated with a user or the merchant device associated with the merchant, wherein the integrated circuit is configured to read from, write to, and/or delete data from the memory based on communicating via an NFC connection, wherein the memory comprises a first predefined region comprising a secure region, a second predefined region comprising a merchant data region, and a third predefined region comprising a transaction data region, wherein the first public encryption key is stored in the secure region, wherein merchant data associated with the merchant is stored in the merchant data region, and wherein the integrated circuit is configured to:
limit communication of data to and/or from the secure region of the memory to the merchant device, wherein, when limiting communication of data to and/or from the secure region of the memory to the merchant device, the integrated circuit is configured to:
prevent data from being read from or written to the secure region of the memory based on communication with a device that is not associated with the merchant;
limit communication of data from the merchant data region of the memory to the user device, wherein, when limiting communication of data from the merchant data region of the memory to the user device, the integrated circuit is configured to:
  permit the user device to read data from the merchant data region, preventing the user device from writing data to the merchant data region, and allowing the merchant device to write data to the merchant data region; and
limit communication of data to the transaction data region of the memory to the merchant device, wherein, when limiting communication of data to the transaction data region of the memory to the merchant device, the integrated circuit is configured to:
  permit the merchant device to read data from the merchant data region, preventing the merchant device from writing data to the transaction data region, and allowing the user device to write data to the transaction data region;
retrieve the first public encryption key of the merchant device from the secure region of the memory;
retrieve the merchant data associated with the merchant from the merchant data region of the memory;
transmit the first public encryption key of the merchant device and the merchant data to the user device via the antenna of the NFC transponder and a first NFC connection, wherein the first NFC connection is between the user device and the NFC transponder;
receive, from the user device, a second public encryption key of the user device for use as a unique identifier of the user device and transaction data associated with a transaction between the merchant and the user via the antenna of the NFC transponder the first NFC connection, wherein the transaction data associated with the transaction between the merchant and the user comprises the first public encryption key of the merchant device and the merchant data;
append the second public encryption key and the transaction data associated with the transaction to a database stored in the memory in response to receiving the second public encryption key and the transaction data associated with the transaction via the first NFC connection, wherein, when appending the second public encryption key and the transaction data associated with the transaction to the memory, the integrated circuit is configured to:
  store, based on receiving the second public encryption key from the user device, the second public encryption key and the transaction data associated with the transaction in the transaction data region of the memory; and
  transmit the second public encryption key and the transaction data associated with the transaction to the merchant device via a second NFC connection, wherein the second NFC connection is between the merchant device and the NFC transponder.

4. The transponder device of claim 3, wherein the integrated circuit is further configured to:
receive a payment token associated with a payment account for the user associated with the user device.

5. A computer program product, comprising at least one non-transitory computer-readable medium including one or more instructions that, when executed by an integrated circuit of a near field communication (NFC) transponder, cause the integrated circuit to:

store a first public encryption key of a merchant device associated with a merchant for use as a unique device identifier of the merchant device in a memory of the integrated circuit, wherein the NFC transponder comprises an antenna, wherein the integrated circuit is powered by an electromagnetic field generated by a user device associated with a user or the merchant device associated with the merchant, wherein the integrated circuit is configured to read from, write to, and/or delete data from the memory based on communicating via an NFC connection, wherein the memory comprises a first predefined region comprising a secure region, a second predefined region comprising a merchant data region, and a third predefined region comprising a transaction data region, wherein the first public encryption key is stored in the secure region, wherein merchant data associated with the merchant is stored in the merchant data region, and wherein the integrated circuit is configured to:
limit communication of data to and/or from the secure region of the memory to the merchant device, wherein the one or more instructions that cause the integrated circuit to limit communication of data to and/or from the secure region of the memory to the merchant device, cause the integrated circuit to:
  prevent data from being read from or written to the secure region of the memory based on communication with a device that is not associated with the merchant;
limit communication of data from the merchant data region of the memory to the user device, wherein the one or more instructions that cause the integrated circuit to limit communication of data from the merchant data region of the memory to the user device, cause the integrated circuit to:
  permit the user device to read data from the merchant data region, preventing the user device from writing data to the merchant data region, and allowing the merchant device to write data to the merchant data region; and
limit communication of data to the transaction data region of the memory to the merchant device, wherein the one or more instructions that cause the integrated circuit to limit communication of data to the transaction data region of the memory to the merchant device, cause the integrated circuit to:
  permit the merchant device to read data from the merchant data region, preventing the merchant device from writing data to the transaction data region, and allowing the user device to write data to the transaction data region;
retrieve the first public encryption key from the secure region of the memory;
retrieve the merchant data associated with the merchant from the merchant data region of the memory;
transmit the first public encryption key of the merchant device and the merchant data to the user device via the antenna of the NFC transponder and a first NFC connection, wherein the first NFC connection is between the user device and the NFC transponder;
receive, from the user device, a second public encryption key of the user device for use as a unique device identifier of the user device and transaction data associated with a transaction between the merchant and the user via the antenna of the NFC transponder and the first NFC connection, wherein the transaction data associated with the transaction between the merchant and the user comprises the first public encryption key of the merchant device and the merchant data;

append the second public encryption key and the transaction data associated with the transaction to a database stored in the memory in response to receiving the second public encryption key and the transaction data associated with the transaction via the first NFC connection, wherein, when appending the second public encryption key and the transaction data associated with the transaction, the instructions cause the integrated circuit to:

store, based on receiving the second public encryption key from the user device, the second public encryption key and the transaction data associated with the transaction in the transaction data region of the memory; and transmit the second public encryption key and the transaction data associated with the transaction to the merchant device via a second NFC connection, wherein the second NFC connection is between the merchant device and the NFC transponder.

6. The computer program product of claim 5, wherein the one or more instructions further cause the integrated circuit to subdivide the memory into the first predefined region and the second predefined region.

7. The method of claim 1, further comprising:

retrieving, with the integrated circuit, transaction data associated with a particular transaction from the transaction data region of the memory based on receiving a read request;

transmitting, with the integrated circuit, the transaction data associated with the particular transaction to user device; and deleting, with the integrated circuit, the transaction data associated with the particular transaction from the transaction data region of the memory based on transmitting the transaction data associated with the particular transaction.

8. The transponder device of claim 3, wherein the integrated circuit is further configured to:

retrieve transaction data associated with a particular transaction from the transaction data region of the memory based on receiving a read request;

transmit the transaction data associated with the particular transaction to user device; and delete the transaction data associated with the particular transaction from the transaction data region of the memory based on transmitting the transaction data associated with the particular transaction.

9. The computer program product of claim 5, wherein the one or more instructions further cause the integrated circuit:

retrieve transaction data associated with a particular transaction from the transaction data region of the memory based on receiving a read request;

transmit the transaction data associated with the particular transaction to user device; and delete the transaction data associated with the particular transaction from the transaction data region of the memory based on transmitting the transaction data associated with the particular transaction.

\* \* \* \* \*